United States Patent
Reger et al.

(10) Patent No.: US 7,024,571 B1
(45) Date of Patent: Apr. 4, 2006

(54) CONVERSION CARD AND METHOD TO CONVERT A GENERAL PURPOSE PERSONAL COMPUTER INTO A DEDICATED MASS STORAGE APPLIANCE

(75) Inventors: Brad A. Reger, Dublin, CA (US); Allen Kilbourne, Tracy, CA (US); R. Guy Lauterbach, Penn Valley, CA (US); Steve Valin, Nevada City, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 454 days.

(21) Appl. No.: 10/219,375

(22) Filed: Aug. 15, 2002

(51) Int. Cl.
*G06F 1/32* (2006.01)

(52) U.S. Cl. .......................... 713/323; 713/324; 713/2; 713/100

(58) Field of Classification Search ................ 713/323, 713/324, 2, 100
See application file for complete search history.

(56) References Cited

U.S. PATENT DOCUMENTS

| | | | |
|---|---|---|---|
| 5,410,680 A * | 4/1995 | Challa et al. | 703/24 |
| 6,529,989 B1 * | 3/2003 | Bashford et al. | 710/306 |
| 6,651,165 B1 * | 11/2003 | Johnson | 713/2 |
| 6,711,059 B1 * | 3/2004 | Sinclair et al. | 365/185.11 |
| 6,718,463 B1 * | 4/2004 | Malik | 713/2 |
| 6,763,398 B1 * | 7/2004 | Brant et al. | 710/8 |
| 6,874,060 B1 * | 3/2005 | Blood et al. | 711/111 |

OTHER PUBLICATIONS

Information about CompactFlash, CompactFlash Association, 2 pages, Aug. 21, 2000.
Intel® RAID Controller SRCMR, 3 pages, 2002.
Intel® RAID Controller SRCMR, Product Specifications, 3 pages, 2001.
Intel® Press Releases, 3 pages, 2002.
Cypress Semiconductor Corporation, Low-Cost 3.3V Zero Delay Buffer, 12 pages, Feb. 19, 2002.
Linear Technology, LTC1326/LTC1326-2.5, Micropower Precision Triple Supply Monitors, 16 pag s, 1998.
Raidtec Corporation, Press Release, 3 pages, Aug. 9, 2002.

\* cited by examiner

*Primary Examiner*—Thomas Lee
*Assistant Examiner*—Vincent Tran
(74) *Attorney, Agent, or Firm*—John R. Ley

(57) ABSTRACT

A general-purpose personal computer is converted into a dedicated mass storage appliance, and a mass storage operating system for performing mass data storage functions is booted from a solid-state, nonvolatile memory card in response to BIOS boot probe signals. The memory card emulates a disk drive for booting purposes, so the BIOS need not be modified to incorporate chain booting. A relatively low latency intermediate memory reads and writes data from a primary expansion bus of the personal computer, and the intermediate memory is separately backed up with power to sustain the data upon a reduction in power, a reset signal, or the absence of a bus clock signal. The conversion may be accomplished by inserting a conversion card into a bus slot of a primary expansion bus of the personal computer.

76 Claims, 8 Drawing Sheets

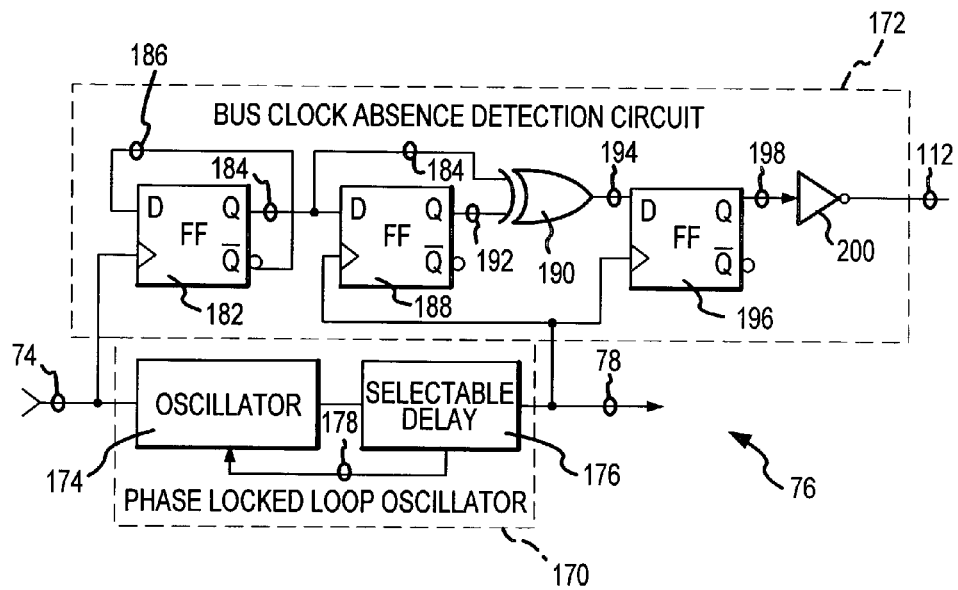
FIG.7
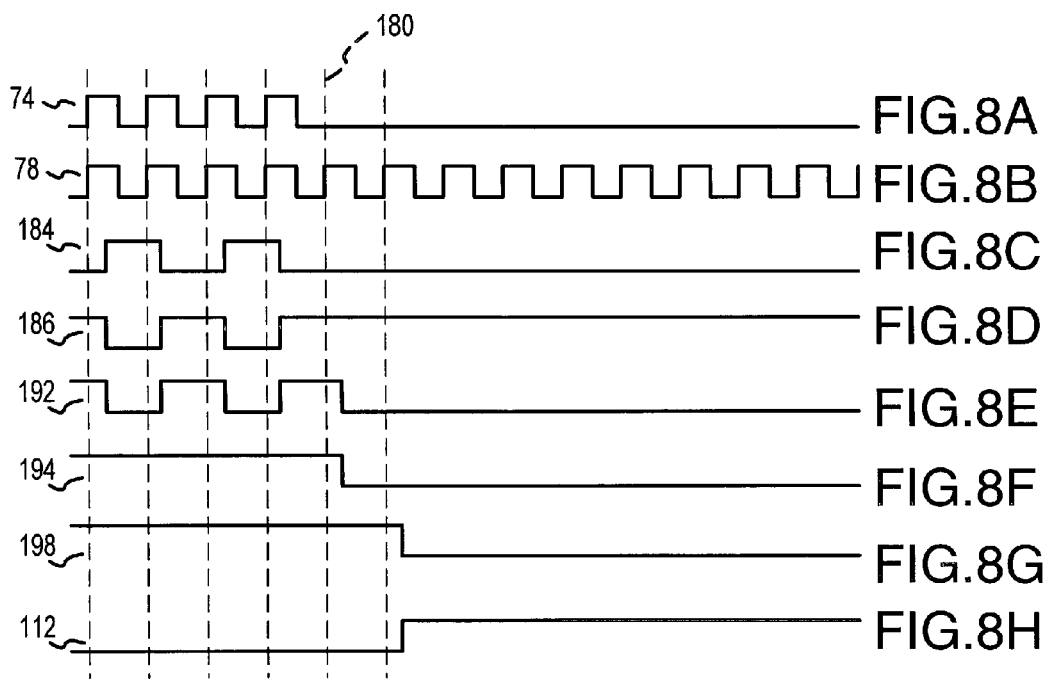

CONVERSION CARD AND METHOD TO CONVERT A GENERAL PURPOSE PERSONAL COMPUTER INTO A DEDICATED MASS STORAGE APPLIANCE

CROSS-REFERENCE TO RELATED APPLICATIONS

This invention and application are related to the following other inventions: "Apparatus and Method for Adapting a General Purpose Computer into a Restricted Access Dedicated-Purpose Computer," described in U.S. application Ser. No. 10/219,392; "Method and Apparatus to Establish Safe State in a Volatile Computer Memory under Multiple Hardware and Software Malfunction Conditions," described in U.S. application Ser. No. 10/219,376; and "Method and Apparatus to Release a Serial Bus from a Suspended State," described in U.S. application Ser. No. 10/219,729. These applications are filed concurrently herewith by some of the present inventors and are assigned to the assignee of the present invention. The disclosures of these related applications are incorporated herein by this reference.

FIELD OF THE INVENTION

This invention relates to the mass storage of data in a computer system, and more particularly to a new and improved conversion card and method which modifies a conventional general purpose personal computer server into a dedicated, high-performance mass storage appliance. The dedicated mass storage appliance delivers enhanced mass storage performance, improved reliability in performing mass storage read and write operations, and greater simplicity in user mass storage applications, all while obtaining the cost benefits of using a relatively low-cost, general-purpose personal computer as its foundation.

BACKGROUND OF THE INVENTION

The ever-increasing use of modern computer systems has created an increased demand to store and utilize large masses of data economically. Mass data storage is economically achieved by using an array of relatively inexpensive or independent disk drives. Such "RAID" (redundant array of independent disks) systems also offer considerable benefits in data reliability because of their well-known ability to reconstruct lost or corrupted data.

The typical RAID mass storage system requires a computer to control the array of disk drives as well as to control the transfer of data when performing read and write operations on the disk drives. Manufacturers of general purpose personal computers have adapted general-purpose personal computers to perform the functions of controlling the array of disk drives and performing the data transfer transactions. When adapted in this manner, the general purpose personal computer is known as a server. Mass storage functionality is achieved by executing an operational program known as a mass storage operating system (MSOS). The mass storage operating system is loaded onto the general purpose personal computer to cause it, as a server, to perform specific mass storage functions.

In general, mass storage specialty organizations would prefer to use general purpose personal computer servers as the hardware component or platform for their customer's specialized mass storage systems. A general purpose personal computer server can be obtained for a relatively lower purchase cost, compared to the cost of assembling hardware components of a specialized computer system to function specifically as a server. Economies of scale are available when producing general purpose personal computers on a large-scale basis, and using a relatively low-cost, general-purpose personal computer as a server takes advantage of this cost benefit.

One disadvantage of using a general-purpose personal computer as a server is that its general-purpose legacy does not provide certain reliability features that are desirable for high-performance mass storage systems. To store data reliably, the data should be saved completely on the RAID disk drives before the write transaction is acknowledged. If the personal computer server ceases functioning ("crashes") or loses power before the data is saved completely to the disk drives, the data is lost. In general, the redundancy and reliability of data storage on a RAID storage system are available only after the data has been completely stored on the disk drives. Thereafter, failures or malfunctions of the disk drives will usually allow the data to be reconstructed. General-purpose personal computer servers usually lack any capability to avoid data loss if a crash or power loss occurs before the data is written to the disk drives.

Disk drives require a relatively long amount of time ("high latency") to perform a read or write transaction, because mechanical components must be moved to perform the operation. Because of the relatively high latency, the speed and performance of the computer system will be adversely affected if the storage transactions are performed directly on the disk drives. The higher latency of the disk drives limits computer system and mass storage performance, because considerable time is lost while waiting for the disk drives to perform the data transactions.

To avoid the latency problem of disk drives, it is typical to use an intermediate, high performance ("low latency") solid-state memory upon which to perform the read and write data transactions. The data is transferred rapidly to the low latency intermediate memory, and then, in a separate transaction which does not adversely affect the processing performance, data is transferred from the intermediate memory to the disk drives simultaneously while other processing occurs. In this manner, the normal processing performance of the computer system is not diminished by mass storage transactions. However, should a crash or power loss occur while the data is present in the intermediate memory and before the data has been completely transferred to the disk drives, that data will be lost and reconstruction of the data becomes impossible.

Intermediate solid-state memories have been made nonvolatile to prevent such data losses. Usually battery backup power is supplied to achieve such nonvolatility. Although certain types of solid-state memories have inherent nonvolatile characteristics, the semiconductor materials used in those types of memories to obtain inherent nonvolatile characteristics require greater time to write the data. Consequently, inherently nonvolatile memories generally have a relatively high, and therefore unacceptable, latency when performing read and write transactions. It is for this reason that inherent nonvolatile solid-state memories are not usually considered acceptable as intermediate nonvolatile memories for a mass storage server. Instead, low latency dynamic random access memories (DRAMs) with a battery backup are typically used as nonvolatile intermediate memories in a mass storage server.

A mass storage nonvolatile memory is not typically included as a part of the typical hardware in a general-purpose personal computer. A battery for supplying backup power to make a conventional DRAM memory nonvolatile is not included as part of the typical hardware in a general-purpose personal computer. A general-purpose personal computer must therefore be modified to accommodate the intermediate memory and the battery backup power to function as a server. The battery should have a sufficient size and capacity to power the intermediate DRAM memory for a number of days in order to sustain the data written to it. Furthermore, a charger for the battery must also be included to keep the battery at its maximum capacity when the battery is not in use. It is not trivial to add a battery backup and charger to obtain nonvolatile, low latency intermediate DRAM memory capabilities in a general-purpose personal computer server because of the extent of modifications required to the internal computer structure. The typical mass data storage user is incapable of or unwilling to perform such modifications.

Even if DRAM and battery backup power for it are incorporated in a general-purpose personal computer, there is typically a lack or deficiency in the functionality of placing the DRAM into a data-preserving state. A number of factors may create error or risk conditions where data will be lost unless the DRAM is placed into a data-preserving state. Some of those conditions include a power interruption or a power reduction, or a hardware or a software malfunction or crash of the central processing unit (CPU) of the personal computer. Even though some attempts are made to place the DRAM into the data-preserving state, many of these potential data-loss conditions may not be adequately addressed, if at all, when attempting to utilize the DRAM to preserve data under potential data-loss conditions.

Another disadvantage of using a general-purpose personal computer as a mass storage server is the potential difficulty of loading or "booting" the mass storage operating system. For redundancy purposes, the mass storage operating system is typically recorded on one or more disk drives of the RAID system. If one of the disk drives fails, the operating system can still be loaded by reading the operating system from another functional disk drive.

Booting or loading an operating system is initiated by the basic input/output system (BIOS) of the core integrated circuits or "core chipset" of the general-purpose computer. The BIOS searches for a single disk drive to obtain programs to boot. Because the mass storage operating system is written on multiple disk drives which are not directly connected to the core chipset, the typical BIOS must be modified to load the mass storage operating system from nonstandard and multiple locations on multiple disk drives other than the usual, single, bootable, local disk drive. This modification is referred to as "chain booting." Modifying the normal BIOS to perform chain booting is possible, but the disadvantage is that the BIOS must be modified into a nonstandard form to incorporate chain booting. Such modifications will usually limit the ability of the general-purpose personal computer server to evolve with future developments of improved software and operating systems. Updating the BIOS to accommodate future evolutions is beyond the capability of the typical user. Transferring the mass storage server to a competent professional for upgrades and revisions is usually impossible because the server is in continual use to service the needs of the mass data storage user.

Another disadvantage of using a general-purpose personal computer as a mass storage server is that it offers an opportunity for the user to interfere with its proper operation. Because of its general-purpose personal computer legacy, the server has the capability to connect monitors, keyboards and other input/output ("I/O") devices. These I/O devices may permit the user to interact with the internal functionality of the server, and such interaction may unintentionally modify or otherwise adversely influence its operation.

Attempts have been made to address some of the disadvantages of using a general-purpose personal computer as a server. For example, electronic circuit cards containing DRAM memory have been added to the expansion bus slots or connectors for the purpose of obtaining low latency intermediate memory for use with the higher latency RAID disk drives. Batteries and chargers have been added inside of the computer housing to make the intermediate DRAM memory nonvolatile. The necessity to modify the internal structure of the personal computer to accommodate the battery and the charger have complicated the use of such cards, as noted above. The necessity to modify the standard BIOS to accommodate chain booting has proved to substantially diminish the ability of the server to evolve with future improvements, as discussed above. Other disadvantages are also known with respect to using general-purpose personal computer servers for high-performance mass data storage applications.

SUMMARY OF THE INVENTION

This invention is directed to converting a general-purpose personal computer server into a dedicated, high-performance mass storage appliance, preferably by simply and conveniently inserting a conversion card in a bus slot or connector of a conventional, peripheral component interconnection expansion bus of the personal computer. A low latency, solid-state intermediate memory is made nonvolatile by a battery power source and charger. A solid-state, inherently nonvolatile bootable memory card contains a mass storage operating system (MSOS) which dedicates the server to performing mass storage functions. The memory card has the capability of emulating or being recognized as a bootable device, thereby allowing the standard, unmodified BIOS of the general-purpose personal computer to boot and load the MSOS directly from the memory card. By loading the MSOS from the memory card, the BIOS does not need to be modified to incorporate chain booting, as was the case when the MSOS was recorded on disk drives associated with the server. Because chain booting is not required, the BIOS remains in a standard configuration to permit future evolutions in software and hardware. Greater reliability is achieved from booting the MSOS directly from the highly reliable memory card. Moreover, the memory card may be made removable to permit upgrades and changes to the MSOS, by simply removing and replacing the memory card.

The data in the intermediate solid-state nonvolatile memory is preserved under the error or risk conditions of a software crash, hardware malfunction or power loss. The intermediate memory, preferably relatively low-latency dynamic random access memory (DRAM) is placed into a self-refresh state and battery power is applied to the DRAM if the internal power supply voltage drops below a predetermined threshold, upon the absence of a bus clock signal on the primary expansion bus, and upon the occurrence of a reset signal on the primary expansion bus. A voltage monitor signals the event of a low voltage condition. A bus clock generator recognizes the absence of primary bus clock signal, but continues to generate a surrogate bus clock signal to permit any data to be written in the intermediate memory even though the primary bus ceases functioning. A reset signal also places the intermediate memory into the data-preserving state. Software crashes and hardware malfunctions will result in the absence of the primary bus clock signal, the assertion of the reset signal, or the low voltage. In this regard, virtually all of the hardware and software malfunctions may be funneled into a single condition which results in placing the intermediate memory into a safe, data-preserving state.

In this manner, a mass storage appliance is implemented by converting a general-purpose personal computer into a dedicated, high-performance mass storage device with few or no requirements for hardware modification, other than the insertion of the conversion card. These and other advantages and improvements are all obtained while retaining the cost advantages and conveniences of using a general-purpose personal computer as the hardware and BIOS basis for the dedicated, high-performance mass storage appliance.

The personal computer which is converted into the mass storage appliance has a primary expansion bus by which to connect peripheral devices and over which to communicate signals with the peripheral devices. The peripheral devices include at least one disk drive mass storage device with respect to which data is read and written. The personal computer also has a basic input output system (BIOS) which generates boot probe signals and loads programs for operating the personal computer and the devices connected on the primary expansion bus.

The conversion card aspect of the present invention involves a bus interface to connect the conversion card to the primary expansion bus. A bridge exchanges signals between the primary expansion bus and a secondary bus on the conversion card. A solid-state memory card is connected to the conversion card and contains nonvolatile code which defines the mass storage operating system (MSOS). The code of the memory card also emulates a disk drive for purposes of booting in response to boot probe signals. A disk controller responds to boot probe signals to connect the memory card through the bridge and the bus interface to the primary expansion bus, so that the memory card is identified as a bootable disk drive and the MSOS is booted to establish mass storage functionality. The conversion card also includes an intermediate memory connected to the bridge to which data is read and written. A battery backup power source is present on the conversion card and connected to the intermediate memory to hold the data. The applied power is monitored and upon a power interruption or reduction, the intermediate memory is placed in a data-preserving state and powered by the battery. A reset signal asserted on the primary bus, or the absence of the primary bus clock signal, also places the intermediate memory in the data-preserving state.

Another form of conversion connects the solid-state memory card to a local system bus of the personal computer so that it responds directly to boot probe signals from the BIOS. Under these circumstances the memory card is not connected through the primary expansion bus. However, the intermediate memory and its data-serving functionality are retained and the intermediate memory is connected to the primary expansion bus.

Methods of converting a conventional general-purpose personal computer into a mass storage appliance dedicated to performing mass data storage functions defined by a mass storage operating system are also other aspects of the present invention.

A more complete appreciation of the present invention and its scope may be obtained from the accompanying drawings, which are briefly summarized below, from the following detailed descriptions of presently preferred embodiments of the invention, and from the appended claims.

BRIEF DESCRIPTION OF THE DRAWINGS

FIG. 7 is a block and logic diagram of a bus clock generator circuit of the conversion card shown in FIG. 3.

FIGS. 8A, 8B, 8C, 8D, 8E, 8F, 8G, and 8H are waveform diagrams of signals of the bus clock generator circuit shown in FIG. 7, all of which are correlated with common time references.

DETAILED DESCRIPTION

Figure 1:
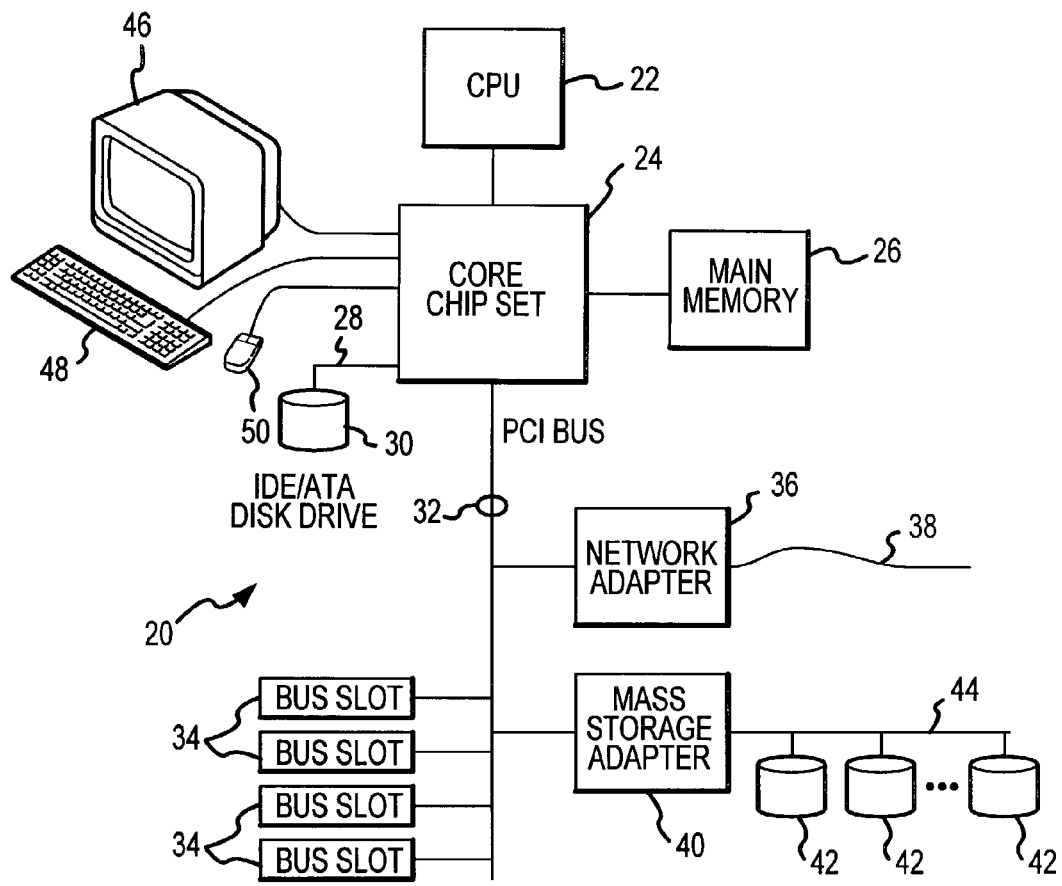
FIG. 1 is an illustration of a prior art, general-purpose personal computer server.

The present invention relates to improvements over a prior art, generic or general-purpose personal computer server 20, of the general type shown in FIG. 1. The general-purpose personal computer server 20 includes a conventional host processor or central processing unit (CPU) 22, a conventional core integrated circuits or "core chipset" 24, and a conventional main memory 26. The CPU 22 performs data processing functions. The core chipset 24 contains the basic instructional code or firmware to initially start and support the basic functionality of the server 20, including the basic input output system ("BIOS") of the server. The main memory 26 is available for use to hold programs, instructions and the results of data processing calculations performed by the CPU 22.

A conventional intelligent drive electronics (IDE) or conventional advanced technology attachment (ATA) bus 28 of the personal computer connects the core chipset 24 to a primary bootable disk drive 30. In general terms, the disk drive 30 contains various programs necessary to implement functionality. Upon startup, the BIOS of the core chipset 24 accesses the IDE/ATA bus 28 to read information from the disk drive 30 and thereby load or "boot" the programs from the disk drive 30 into the main memory 26 to establish functionality.

At least one conventional peripheral component interconnect (PCI) bus is also connected to the core chipset 24. The PCI bus 32 is the primary means to connect a variety of peripheral components to enhance the functionality of the basic computer system formed by the CPU 22, the core chipset 24, the main memory 26 and the bootable disk drive 30. The PCI bus 32 is a primary expansion bus which is separate from the local computer bus 28 which interconnects the CPU 22 and the main memory 26 and the bootable disk drive 30. Peripheral components are connected to the PCI bus 32 through conventional connectors known as "bus slots" 34.

In a typical mass storage server, one of the peripheral components connected to the PCI bus 32 is a network adapter 36. The network adapter 36 connects the server 20 to a local area network, a wide area network, or some other form of a communication medium 38 by which to transfer data between the server 20 and other components connected to the communication medium 38.

Because the server 20 is intended primarily to perform mass data storage functions, a mass storage adapter 40 is connected to the PCI bus 32 in a typical mass storage server. A plurality of relatively inexpensive mass storage disk drives 42 are connected by a separate bus 44 to the mass storage adapter 40. The bus 44 may take the form of any conventional bus which permits communication between the mass storage adapter 40 and each of the disk drives 42. For example, the bus 44 may be a conventional standard computer small interface ("SCSI") bus. The mass storage adapter 40, the plurality of disk drives 42 and their interconnection bus 44 form a conventional redundant array of inexpensive or independent disks (RAID) mass storage system. The mass storage adapter 40 contains the necessary independent functionality to perform typical RAID mass storage functions in conjunction with the other components of the typical server.

Because its legacy to a general-purpose personal computer formed by the CPU 22, the core chipset 24, the main memory 26, the IDE/ATA bus 28 and the disk drive 30, the server 20 also includes conventional input/output (I/O) devices such as a monitor 46, a keyboard 48 and mouse 50, which are connected to the core chipset 24. These I/O devices 46, 48 and 50 are available to the user to control and modify the functionality of the server, as permitted by the programs executed. The I/O devices and all of the other components of the server 20 are essentially conventional and well known, both in the context of a personal computer and in the context of a server.

Figure 2:
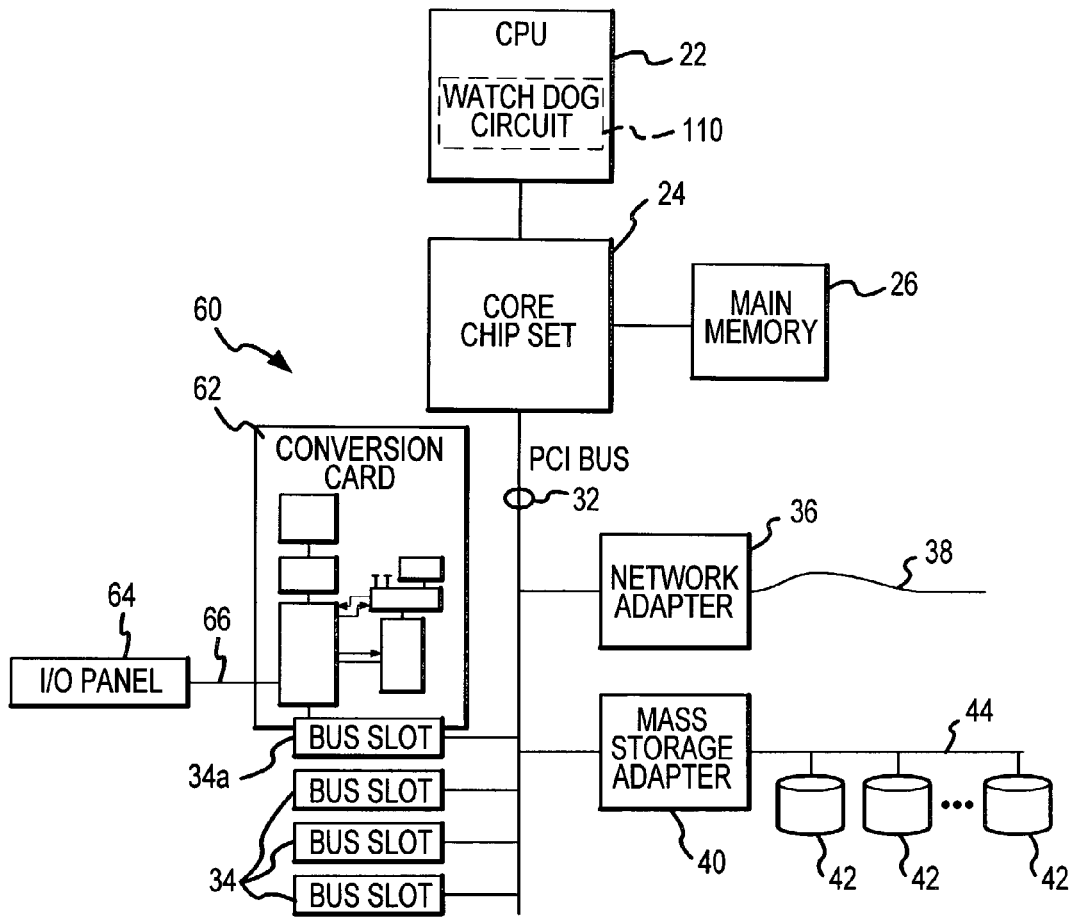
FIG. 2 is an illustration of a general-purpose personal computer which has been converted into a dedicated, high-performance mass storage appliance in accordance with the present invention.

In accordance with an embodiment of the present invention shown in FIG. 2, a new and improved mass storage appliance 60 is created by inserting a conversion card 62 into one (34*a*) of the bus slots 34. In addition, a simplified user interface I/O panel 64 is used in connection with the conversion card 62 by connecting the conversion card 62 and the I/O panel 64 with a serial bus 66. The serial bus 66 includes a cable having a few conductors which connect to master and slave interface controllers at opposite ends of the cable. The conversion card 62 contains the code defining a mass storage operating system (MSOS), and the code defining the MSOS is loaded into the main memory 26 as the primary executable program of the server 60. By establishing the MSOS as the primary functional software, the computer system becomes dedicated exclusively to performing high-performance mass data storage functions. The dedicated mass data storage functions include file and memory block read and write transactions, as well as other functions supporting those read and write transactions.

Because of the dedicated mass storage functionality of the server 60, the conventional monitor 46, keyboard 48 and mouse 50 of the general-purpose server 20 (FIG. 1) are no longer needed. Instead, the simplified I/O panel 64 allows the user to perform the limited number of input functions and to receive only the amount of output information necessary to recognize proper performance and status of the mass storage appliance 60. The restricted and dedicated mass storage data transaction functions performed, as well as the self-initiating and self-establishing aspects of directly loading the MSOS from the conversion card 62, make the general-purpose personal computer system an appliance, in the sense that an appliance can be connected, powered up and almost immediately used in a self-executing manner without the necessity for significant user control or influence.

Figure 3:
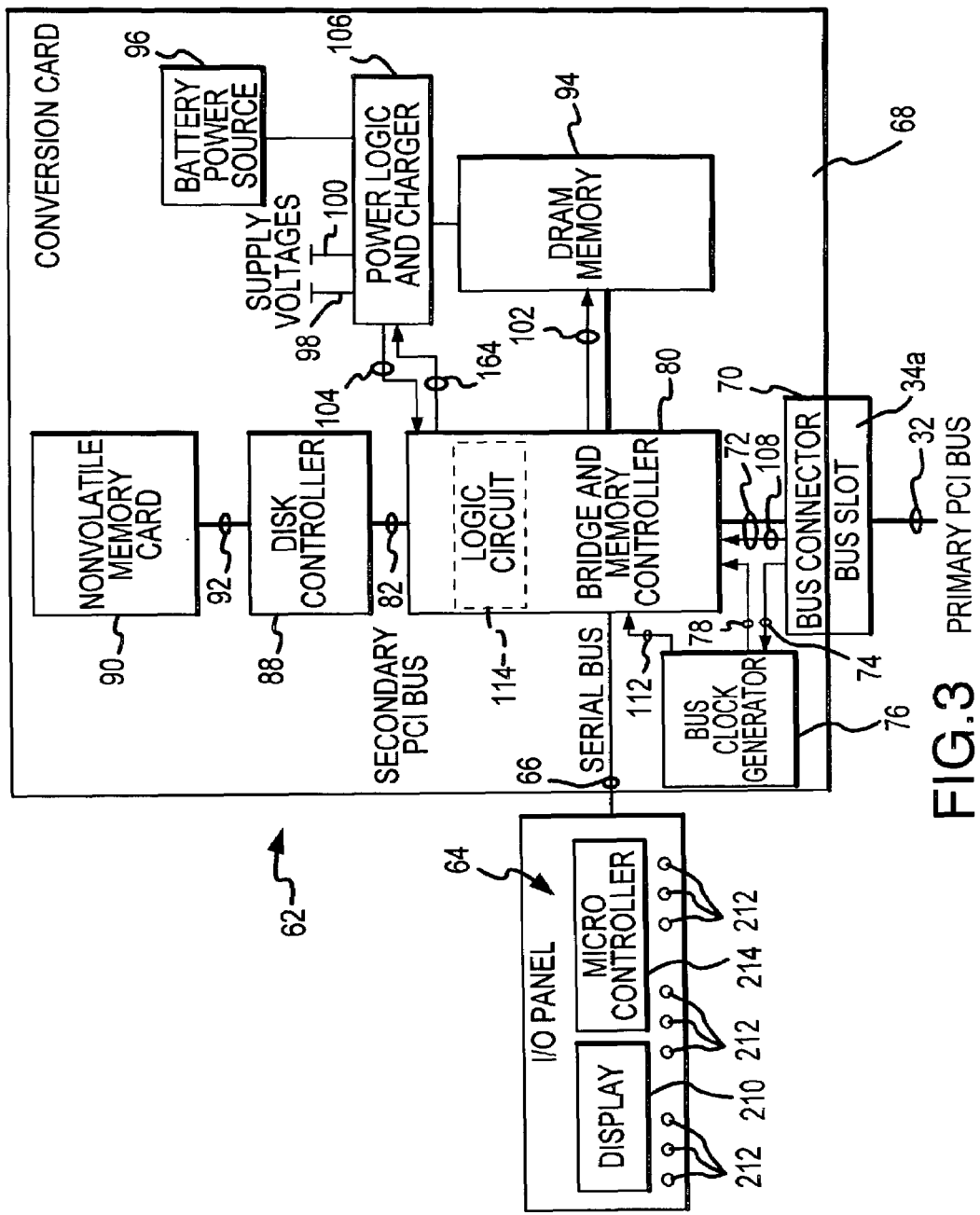
FIG. 3 is a block diagram of components of a conversion card and a front panel shown in FIG. 2 used to convert the personal computer into the mass storage appliance.

The dedicated nature of the mass storage appliance 60 is achieved primarily by the conversion card 62, which is shown in greater detail in FIG. 3. The conversion card is preferably formed on a conventional printed circuit board 68. Certain mechanical details of the conversion card 62 are described in the above-referenced invention, Ser. No. 10/219,392. The conversion card 62 includes a conventional bus connector 70 formed on the edge of the printed circuit board 68 to fit into one 34*a* of the bus slots 34 of the PCI bus 32 (FIG. 2). Conductors 72 from the bus connector 70 extend onto the printed circuit board 68. The conductors 72 are extensions of the conductors of the primary PCI bus 32, with the exception of the primary PCI bus conductor 74 which carries the primary PCI bus clock signal. The primary bus clock signal at 74 is applied to a bus clock generator 76. As described more completely below, the bus clock generator 76 replicates the primary bus clock signal at 74 and supplies the replicated signal as a surrogate bus clock signal on the conductor 78. Under normal functionality, the surrogate bus clock signal at 78 is essentially identical to the primary bus clock signal 74, so the conductors 72 and 78 appear as an extension of the primary PCI bus 32.

A conventional PCI to PCI bridge and memory controller 80 is connected to the conductors 72 and 78. Similar conductors also extend from the bridge and memory controller 80 to form a secondary PCI bus 82 on the printed circuit board 68. The conductors which form the secondary PCI bus 82 correspond to the conductors 72 and 78 on the printed circuit board 68 and those corresponding conductors which form the primary PCI bus 32. The bridge and memory controller 80 selectively connects the primary PCI bus 32 to the secondary bus 82, and performs the other typical functions of a conventional bridge and memory controller 80, under the control of a CPU (not shown) which is an integral part of the bridge and memory controller 80. The CPU and memory which holds its instructions (also not shown), which are integral with the bridge and memory controller 80 could also be separate from the other integrated circuits or chip set which form the bridge and memory controller 80. One commercial embodiment of the bridge and memory controller 80 is supplied by Intel Corporation of Santa Clara, Calif., under the product designation RAID controller SRCU32.

A conventional PCI to IDE disk controller 88 is connected to the secondary PCI bus 82. The disk controller 88 is a conventional integrated circuit chip which is typically used to control a standard disk drive in response to signals delivered to it from a PCI bus. One example of a suitable disk controller 88 is supplied by Promise Technologies of Milpitas, Calif. under product designation Ultra 100 TX2. When used in the conversion card 62, however, the sole function of the disk controller 88 is to recognize and respond to peripheral device boot probe signals supplied by the BIOS from the core chipset 24 (FIG. 2) over the primary PCI bus 32 during booting operations.

The conversion card 62 includes a conventional nonvolatile solid-state memory card 90. The memory card 90 is connected to the disk controller 88 by conductors formed on the printed circuit board 68 in the form of a conventional IDE/ATA bus 92. The nonvolatile memory card 90 is preferably a conventional "CompactFlash" removable mass storage device supplied by SanDisk Corporation of Sunnyvale, Calif. The code within the memory card 90 is made nonvolatile by the characteristics of the solid-state components of the memory card 90.

The nonvolatile memory card 90 is directly compatible and functional with an, IDE/ATA bus and interface, and emulates a disk drive. As such, the nonvolatile memory card 90 responds to peripheral device probe signals supplied by the BIOS during booting, and the memory card 90 appears as though it was a disk drive to the BIOS. The peripheral device boot probe signals supplied during booting are conducted from the primary PCI bus 32 through the bridge and memory controller 80 to the secondary PCI bus 82, and through the disk controller 88 to the memory card 90. The boot probe signals are not delivered to the IDE/ATA bus 28 and bootable disk drive 30 (FIG. 1) because those components are not used in the dedicated mass storage appliance 60.

The memory card 90 contains nonvolatile code which defines the MSOS for the mass storage appliance 60 (FIG. 2). In response to the peripheral device boot probe signals from the BIOS, the disk controller 88 transfers signals which define the MSOS code from the memory card 90 to the secondary PCI bus 82. The bridge and memory controller 80 conduct the signals from the secondary PCI bus 82 to the primary PCI bus 32. The signals which define the MSOS are conducted through the primary PCI bus 32 into the main memory 26 (FIG. 2), where they establish the MSOS as the primary functionality of the mass storage appliance 60.

By using the nonvolatile memory card 90 and the disk controller 88 in this manner, the MSOS may be booted directly and completely from the memory card 90. Because the operating system will be loaded directly from the memory card 90, there is no necessity to modify the BIOS of the core chipset 24 (FIG. 2) to include chain booting, as was necessary when the MSOS was booted from one or more RAID disk drives 42 (FIG. 1). Chain booting was required in the BIOS in that circumstance to address the possibility of a failed RAID disk drive which contained the MSOS. Instead, with the present invention, the BIOS remains in its standard form, because the entire MSOS is booted directly from the memory card 90. The solid-state memory card 90 offers considerably greater reliability than a mechanically-rotating disk drive, so there is very little possibility that the memory card 90 will itself fail. Even if the memory card 90 did fail, it is a relatively easy task to replace it with a fully functional memory card, as described in the above-referenced invention, Ser. No. 10/219,392.

Because of the relatively high reliability of the memory card 90, it is not necessary to write the MSOS onto the RAID disk drives 42 (FIG. 2) in the manner previously done. However, it may nevertheless be desirable to include a secondary backup copy of the MSOS on the RAID disk drives for further redundancy purposes.

Using a standard version of BIOS permits the mass storage appliance to continue to evolve with further software and hardware developments, rather than be restricted in evolution by a nonstandard version of the BIOS. By including the entire MSOS on the single nonvolatile memory card 90, and making the memory card 90 removable and replaceable as is described in the above-referenced invention, Ser. No. 10/219,392, the MSOS can be easily updated by substituting a memory card 90 containing a newer or updated version of the MSOS for an outdated memory card.

In addition to the memory card 90 containing a copy of the entire MSOS, the memory card 90 also preferably includes a conventional boot loader program which is initially accessed by the BIOS of the core chipset 24 (FIG. 2). The boot loader program assists in loading or booting other larger programs such as the most current version of the MSOS, an earlier or previous version of the MSOS, or diagnostic programs to search for hardware failures, for example. The boot loader program will normally automatically boot the most current version of a selected program, such as the current version of the MSOS, but this automatic booting functionality may be disabled to allow a different chosen program to be booted.

The MSOS is preferably implemented as computer-executable code operable on a personal computer for managing data access and implementing file symantics. The MSOS can be implemented as an application program operating over a general-purpose operating system, such as UNIX (registered trademark) or Windows NT (registered trademark), or as a general-purpose operating system with configurable functionality for storage applications. In such cases the general-purpose operating system may also be booted directly from the memory card 90 along with the MSOS application program, or the general-purpose operating system can be booted from other conventional sources and the MSOS application program booted from the memory card 90. However, the MSOS is preferably implemented as a storage-dedicated operating system as described herein, rather than as a mass storage application program operating over a general-purpose operating system. The MSOS can take the form, for example, of a microkernel, such as the Data ONTAP (trademark) operating system available from Network Appliance of Sunnyvale, Calif., the assignee hereof.

The bridge and memory controller 80 also transfers data from the primary PCI bus 32 to a conventional dynamic random access memory (DRAM) 94. The DRAM 94 performs the function of a low latency intermediate memory with respect to the host CPU 22 and the RAID mass storage system formed by the adapter 40, RAID disk drives 42 and interconnector bus 44 (FIG. 2). Because the DRAM 94 has low latency characteristics for read and write operations, data may be transferred between the host CPU 22 and the DRAM 94 with greater speed to achieve higher performance from the mass storage appliance 60, compared to the undesirable situation where the host CPU 22 interacts directly with the RAID mass storage system. Data from the DRAM 94 can be written to the much higher latency RAID disk drives 42 under circumstances which do not restrict the speed or performance of the host CPU 22, as is well known. The data transfer to the DRAM 94 occurs in read and write operations which are supervised or controlled by the bridge and memory controller 80. In addition, the integral CPU (not shown) of the bridge and memory controller 80 may also perform conventional RAID data manipulations, such as the calculation of parity, along with the read and write operations.

The DRAM 94 is made nonvolatile to prevent data from being lost should a power interruption or reduction or a hardware or software crash occur at a time when data is within the DRAM 94 and before it has been written to the RAID disk drives 42 (FIG. 2). In order to provide this nonvolatility or reliability against data loss, electrical power is supplied to the DRAM 94 by a battery power source 96 under circumstances where the level of an internal main voltage 98 or the level of an internal logic voltage 100 of the mass storage appliance 60 falls below a predetermined minimum operating limits. The internal main and logic voltages 98 and 100 are DC voltages, but they are derived from the typical commercial AC power mains. Because the battery power source 96 is an independent power supply, the data in the DRAM 94 may be preserved by power from the battery power source 96, such that the data in the DRAM 94 is not longer dependent upon the continued application of power from the internal supply voltages 98 and 100. Consequently, if power from the AC mains source is disrupted or diminished, or if there is a failure of the internal power supplies which supply the main internal voltage 98 or the internal logic voltage 100, the DRAM 94 maintains its data as a result of power supply from the battery power source 96.

The DRAM 94 is of the type having a self-refresh functionality. Self-refresh functionality is conventional and permits the DRAM 94 to self-generate the periodic refresh signals necessary to maintain data within the memory cells of the DRAM 94. All dynamic random access memories require some form of refresh signals to maintain their data, but normally the refresh signals are supplied by a component external to the dynamic random access memory. Activating the self-refresh capability of the DRAM 94 permits it to self-refresh itself by using the power supplied from the battery power source 96, during conditions when the main voltage 98 or the logic voltage 100 has diminished or failed. Activating the self-refresh capability of the DRAM 94 is essential to preserving the data, because the external components which normally generate the periodic refresh signals may be disabled by a power failure or hardware or software crash.

When the DRAM 94 enters a self-refresh mode of operation, the amount of power consumed to refresh the memory cells is also diminished compared to normal power consumption. Power to execute the self-refresh capability will normally be supplied by the battery power source 96 under self-refresh circumstances, so the reduced power consumption DRAM 94 in the self-refresh mode of operation contributes to maintaining the data within the DRAM 94 for an extended period of time.

The bridge and memory controller 80 supplies a self-refresh enable signal 102 to the DRAM 94, to enable the DRAM 94 to commence the self-refresh mode of operation. The self-refresh enable signal 102 is delivered to the DRAM 94 in response to signals which represent the occurrence of various conditions which could lead to a malfunction of the mass storage appliance 60 and the loss of data.

One of the conditions which could result in the loss of data unless the self-refresh enable signal 102 was asserted, is a low voltage condition which precedes an interruption or reduction in the supplied power. Such a condition could result from the loss of or reduction in the supplied AC mains power to the mass storage appliance 60. A reduction or interruption of power could also result from the failure of one of the internal power supplies which supply the internal main voltage 98 or the logic voltage 100. A power logic and charger circuit 106 monitors the internal voltage supplies 98 and 100 for a low voltage condition. Upon detecting such a condition, the power logic and charger circuit 106 delivers the low voltage warning signal 104 to the bridge and memory controller 80.

Another condition which would result in the loss of data unless the self-refresh signal 102 was asserted is an intentional power-down of the host CPU 22 (FIG. 2). An intentional power-down is executed by manually resetting the mass storage appliance. Under this condition, a primary bus reset signal 108 is generated by the conventional power down functionality of the host CPU 22. The primary bus reset signal 108 is delivered to the bridge and memory controller 80 on one of the conductors 72 of the primary PCI bus 32. Under the usual reset power-down conditions, the bus reset signal 108 is supplied by the host CPU 22 just before the electrical power to the mass storage appliance 60 is shut off. Delivering the bus reset signal before discontinuing power allows the other components of the computer system which are connected to the PCI bus 32 to recognize the bus reset signal and enter a safe state before the power is actually terminated.

Some conventional personal computer servers that might be used to create the mass storage appliance 60 may deliver the primary bus reset signal simultaneously with terminating the electrical power, or may actually terminate the power before delivering the bus reset signal. Regardless of the timing of the bus reset signal 108 relative to power termination, the power logic and charger circuit 106 will assert the low voltage warning signal 104 independently of the assertion of the bus reset signal 108 by the host CPU 22.

A malfunction condition which could cause the loss of data unless the self-refresh signal 102 was asserted, results from a hardware or a software crash or malfunction in the host CPU 22 (FIG. 2). A hardware or software crash is detected by a watchdog circuit 110 (FIG. 2) which is connected to the host CPU 22. Upon sensing the discontinuance of program instruction execution, the watchdog circuit 110 causes the primary bus reset signal 108 to be delivered to the bridge and memory controller 80 over the PCI bus 32. A similar situation exists if the host hardware malfunctions to the point where no further programmed instructions can be executed. Details of the watchdog circuit 110 are described in the above-referenced invention, Ser. No. 10/219,376.

Another condition which could result in the loss of data unless the self-refresh signal 102 was asserted, is a major malfunction of the primary PCI bus 32. Proper functionality of the primary PCI bus 32 is indicated by the regular delivery of pulses of the bus clock signal 74. The occurrence of clocking pulses of the bus clock signal 74 are necessary to achieve normal bus operation. The absence of the bus clock signal indicates a malfunction of the PCI bus 32. A malfunction of the PCI bus 32 prevents the transfer of data to and from the DRAM 94 and the RAID mass storage system, thereby compromising or destroying the reliability of the data. A primary bus malfunction could occur independently of a software or hardware malfunction of the main CPU 22 or a loss or termination of power. The bus clock generator 76 monitors the regular occurrence of pulses of the primary bus clock signal 74. Upon detecting the absence of the primary bus clock signal 74, the bus clock generator 76 delivers a bus clock absence signal 112 to the bridge and memory controller 80.

Figure 4:
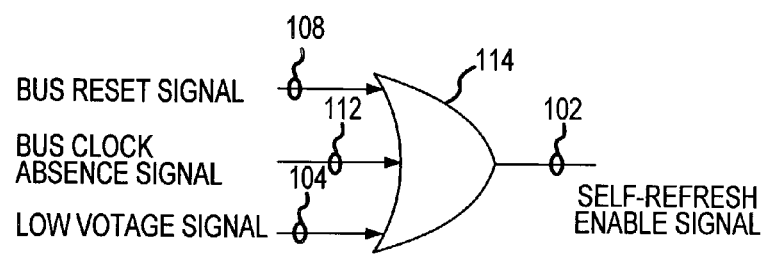
FIG. 4 is a logic representation of the functionality of a local CPU of a bridge and memory controller of the conversion card shown in FIG. 3, in supplying a self-refresh enable signal to a DRAM memory of the conversion card shown in FIG. 3.

These major conditions leading to a potential for data loss, (low or lost power, host CPU power-down, host CPU hardware or software crash, and primary bus function cessation) are represented by the assertion of the low voltage warning signal 104, the bus reset signal 108 and the bus clock absence signal 112. These three error- or malfunction-created signals 104, 108 and 112 are applied to a logic circuit 114 of the bridge and memory controller 80, as shown in FIGS. 3 and 4. The logic circuit 114 functions generally as a logical OR gate as shown in FIG. 4. In response to any one of the three signals 104, 108 and 112, the logic circuit 114 supplies the self-refresh enable signal 102 to the DRAM 94 (FIG. 3) to place the DRAM 94 into the self-refresh operational state. Placing the DRAM 94 into its self-refresh state, in conjunction with the power logic and charger circuit 106 applying power from the battery power source 96 to the DRAM 94, preserves the data within the DRAM. Without preserving the data, that data would be irretrievably lost once the malfunction condition is resolved. The logic circuit 114 is preferably implemented in programmable logic which is either internal or external to the bridge and memory controller 80. The programmable logic implements a state machine to achieve the functionality of the logic circuit 114. More detail concerning the functionality of the logic circuit 114 is described in the above-referenced invention, Ser. No. 10/219,376.

Figure 5:
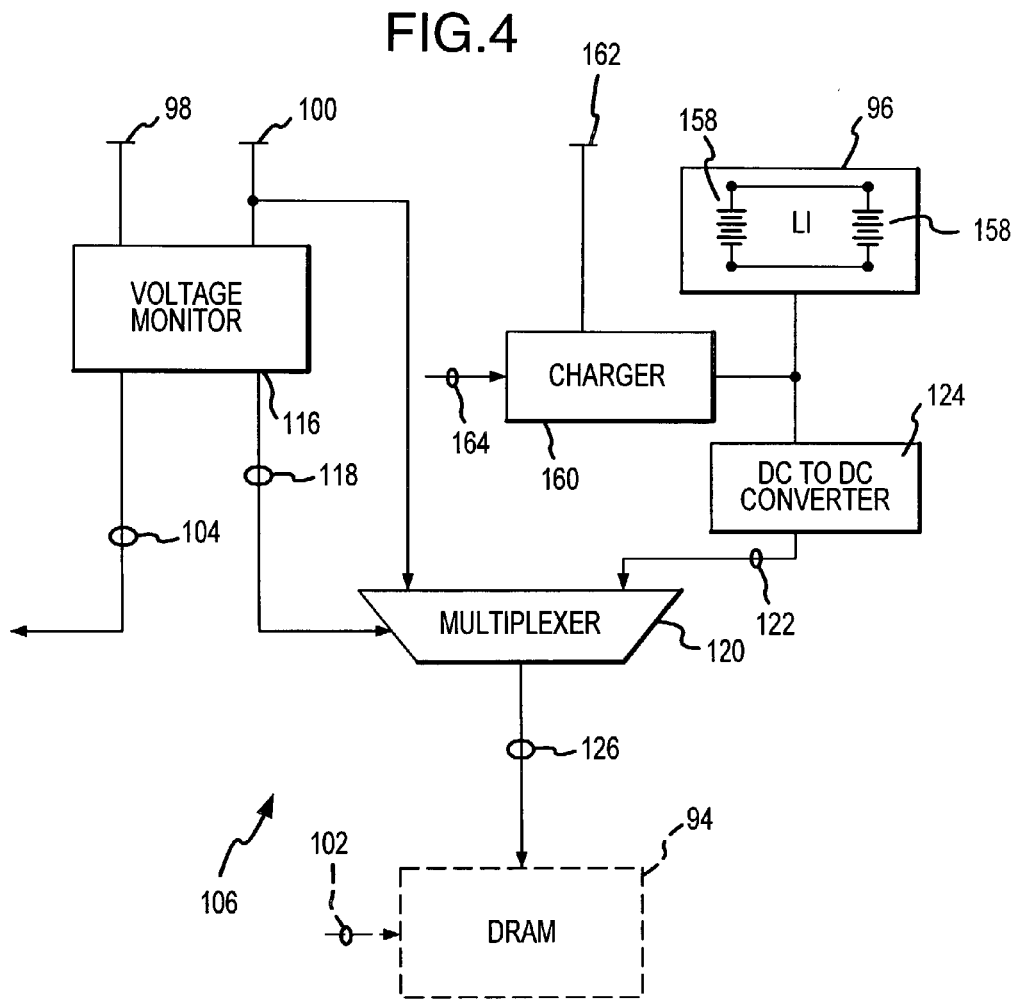
FIG. 5 is a simplified block diagram of a power logic and charger component of the conversion card shown in FIG. 3.
Figure 6:
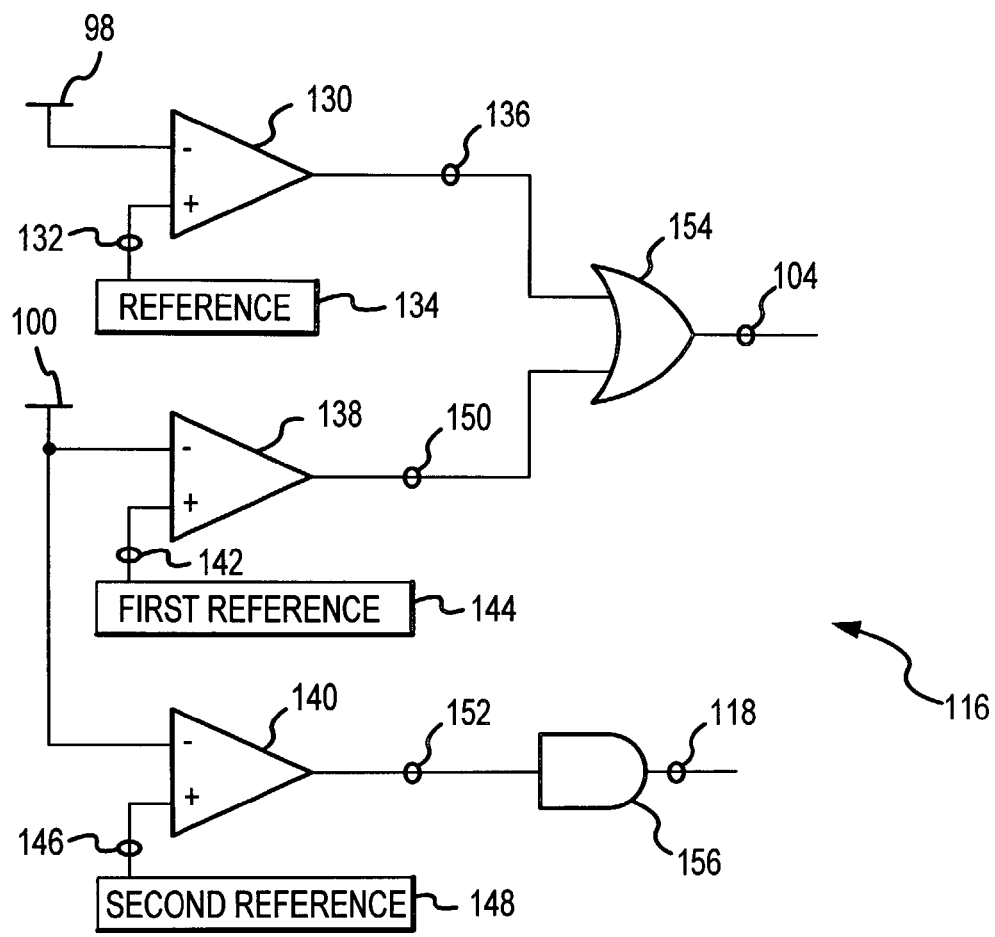
FIG. 6 is a generalized logic diagram illustrating the functionality of a voltage monitor shown in FIG. 5.

More details concerning the power logic and charger circuit 106 are shown in FIGS. 5 and 6. The power logic and charger circuit 106 monitors the internal voltages 98 and 100 within the mass storage appliance, connects the battery power source 96 to the DRAM 94 under conditions when either or both of the internal voltages 98 and 100 diminish, and periodically charges the battery power source 96 to maintain it in a fully charged state. While the internal voltages 98 and 100 are sufficient and indicative of normal functionality, the DRAM 94 is powered by internal voltage. If either of the internal voltages 98 and 100 drop below a predetermined minimum threshold voltage, thereby indicating a potential malfunction in a power supply within the mass storage appliance or a disruption or reduction in voltage from the conventional AC power mains, power for the DRAM 94 is switched to the battery power source 96. The battery source 96 is periodically charged during normal operation, when the voltages 98 and 100 are within normal limits.

The power logic and charger circuit 106 includes a voltage monitor 116 which senses the level of two internal voltages 98 and 100. The internal voltage 98 is the main DC power supplied throughout the mass storage appliance. The other internal voltage 100 is the DC power supplied to the logic circuits within the mass storage appliance. The voltage 100 primarily powers the DRAM 94 (FIG. 3). Both voltages 98 and 100 are derived from the conventional AC power supplied to the mass storage appliance. Conventional conversion power supplies within the mass storage appliance convert the AC power into the voltages 98 and 100. Normally the main internal voltage 98 is approximately 5 volts and the logic voltage is approximately 3.3 volts.

A failure or reduction in the main AC power supplied to the mass storage appliance will be reflected in a diminishing value of the voltages 98 and 100. Neither voltage 98 nor voltage 100 will immediately terminate with an AC power mains interruption or reduction, because of the normal internal capacity of the internal power supplies. However, the decay of the voltages 98 and 100 will begin immediately and will reduce in a relatively short time. Monitoring the voltages 98 and 100 in effect monitors the proper level and stability of the AC mains power supplied to the mass storage appliance and will also detect a condition where one of the internal power supplies within the mass storage appliance fails or malfunctions. Upon detecting a condition where one of the internal voltages 98 or 100 falls below a predetermined threshold, the voltage monitor 116 delivers the low voltage warning signal 104 to the logic circuit 114 of the bridge and memory controller 80 (FIG. 3).

The voltage monitor 116, shown in FIG. 5, supplies a power selection signal 118 to a multiplexer 120. The multiplexer 120 is a conventional two-input device. One input is from the internal logic voltage 100. The other input is a voltage 122 from a DC to DC power converter 124. One logical state of the power selection signal 118 causes the internal logic voltage 100 to be supplied from the output 126 of the multiplexer 120, and the other logical state of the power selection signal 118 causes the voltage 122 to be supplied to the output 126 of the multiplexer 120. Under normal conditions, the voltage monitor 116 supplies the power selection signal 118 in one logical state, for example a logical low level, which causes the multiplexer 120 to supply the internal logic voltage 100 to power the DRAM 94. Under abnormal conditions of diminishing internal voltage, the voltage monitor 116 supplies the power selection signal 118 in the other logical state, for example a logical high level, causing the multiplexer 120 to supply the voltage 122 to power the DRAM 94.

The DC to DC converter 124 converts the level of the voltage from the battery power source 96 to the voltage level 122 which is sufficient to power the DRAM 94. Depending upon the characteristics of the DRAM 94 and the normal output voltage of the battery power source 96, the DC to DC converter 124 may not be required. The DC to DC converter 124 is conventional.

The voltage monitor 116 is preferably a conventional multi-voltage supply monitor, having the functionality shown generally in FIG. 6. The main internal voltage 98 is supplied to a negative input terminal of a comparator 130. The positive input terminal to the comparator 130 receives a signal 132 from a main internal reference 134. The analog level of the signal 132 from the main internal reference 134 represents the minimum amount of voltage to which the main internal voltage 98 is permitted to decrease before an abnormal voltage condition is indicated. So long as the main internal voltage 98 remains above the level of the main internal reference signal 132, the comparator 130 supplies a low level output signal 136. The low level output signal 136 represents the presence of normal voltage conditions. Should the main internal voltage 98 decrease below the level of the main internal reference signal 132, the comparator 130 supplies a high level output signal 136. The high level output signal 136 signifies the presence of an abnormal condition in which the main internal voltage 98 decreases below an acceptable level represented by the main internal reference 134. For example, the analog level of the main internal reference signal 132 may be selected to be five percent less than the normal operating level of the main internal voltage 98.

The internal logic voltage 100 is supplied to the negative input terminals of comparators 138 and 140. A signal 142 from a first reference 144 and a signal 146 from a second reference 148 are supplied to the positive input terminals of the comparators 138 and 140, respectively. The analog level of the first reference signal 142 represents the minimum amount of voltage to which the logic voltage 100 is permitted to decrease before an abnormal logic voltage supply condition is indicated. For example, the level of the first reference signal 142 may be five percent less than the normal operating level of the logic voltage 100. The analog level of the second reference signal 140 is less than the analog level of the first reference signal 142. The second reference signal 146 thereby represents a lesser voltage than an abnormal logic voltage level. For example, the level of the second reference signal 146 may be ten percent less than the normal logic voltage 100 and approximately five percent less than the first reference signal 142.

So long as the internal logic voltage 100 remains above the level of the first and second reference signals 142 and 146, the comparators 138 and 140 supply low level output signals 150 and 152, respectively. The low level output signals 150 and 152 represent the presence of normal logic voltage. Should the logic voltage 100 decrease below the level of the first reference signal 142 but remain above the level of the second reference signal 146, the comparator 138 supplies a high level output signal 150 while the comparator 140 supplies a low level output signal 152. In this condition, the high level output signal 150 signifies the occurrence of the abnormal condition of the logic voltage 100 decreasing below an acceptable level represented by the first reference 144. As the logic voltage 100 continues to decrease below the level of the second reference signal 146, the comparator 140 supplies the high level output signal 152 after the time that the comparator 138 has supplied the high level output signal 150.

The output signals 136 and 150 are applied to an OR gate 154. Upon the first occurrence of a high level of one of the output signals 136 or 150, the OR gate 154 supplies the low voltage warning signal 104. As described above, the low voltage warning signal 104 is supplied to the logic circuit 114 of the bridge and memory controller 80 (FIG. 3), where the low voltage warning signal 104 results in the delivery of the self-refresh enable signal 102 to the DRAM 94. Consequently, upon either the main internal voltage 98 or at the internal logic voltage 100 decreasing to an abnormal level, the low voltage warning signal 104 will be delivered by the OR gate 154.

As the internal voltage continues to decrease, and at a later time established by the rate of decrease of the internal logic voltage and by the level of the second reference signal 146 relative to the first reference signal 142, the comparator 140 delivers the high output signal 152. The high output signal 152 is applied to a buffer 156 and the output of the buffer 156 is the power selection signal 118. As described above, the power selection signal 118 controls the multiplexer 120 (FIG. 5) to deliver either the logic level voltage 100 or the battery-derived voltage 122 for powering the DRAM 94. By delaying the application of the power selection signal 118 as a result of using the second reference signal 146 which is less than the first reference signal 142, the DRAM 94 is placed into the self-refresh mode before power from the battery power source 96 (FIG. 5) is applied to it. Consequently, the DRAM 94 stabilizes in the self-refresh mode of operation before the battery power is switched to it. Placing the DRAM 94 in the self-refresh mode before switching the power from the battery power source 96 to the DRAM 94 avoids consuming power from the battery power source before it is needed and also avoids the possibility of inadvertently disabling the self-refresh mode of operation of the DRAM 94 if the battery power application and the self-refresh mode were initiated at the same time.

The battery power source 96 is preferably formed by a plurality of individual lithium ion battery cells 158 which are electrically connected in parallel, as shown in FIG. 5. The lithium ion battery cells 158 are electrically connected in parallel to provide increased capacity for powering the DRAM 94, and to provide redundancy if one of the individual battery cells 158 should fail. Selecting lithium ion battery cells 158 for use as the battery power source 96 makes it possible to obtain redundancy. Lithium ion batteries have the inherent characteristic of failing in an open circuit condition. Should one of the cells 158 fail, its open circuit condition will permit the other parallel-connected cell 158 to continue to supply power. Using multiple lithium ion battery cells connected in parallel eliminates a single cell failure as a failure condition which would result in loss of data within the DRAM 94. The redundancy of the multiple lithium ion cells 158 is therefore important in contributing to the reliable maintenance of the data within the DRAM 94.

Lithium ion cells 158 exhibit a relatively long usable lifetime and a relatively high power density. The high power density means that a relatively large amount of electrical power is available from a relatively small package. The relatively small package permits multiple lithium ion cells 158 to be connected in parallel. Two typical, two parallel-connected lithium ion cells permit adequate power to maintain data within the DRAM 94 for approximately five to seven days when the DRAM 94 is in the low-power, self-refresh mode. The relatively small lithium ion battery package is also light in weight, and these advantages permit the multiple, parallel-connected lithium ion cells 158 to form a battery power source 96 that can be directly mounted on and connected to the printed circuit board 68. This offers a considerable advantage over lead acid battery power sources, which are relatively large, have a relatively lower power density, are more prone to failure, and exhibit a shorter lifetime. Moreover, because of their larger size, lead acid battery sources must be located elsewhere within an enclosure for the server and connected by conductors extending to the nonvolatile DRAM. Other types of batteries may not offer the convenience of being included on the single printed circuit board 68 which forms the conversion card 62.

The power logic and charger circuit 106, shown in FIG. 5, includes a conventional charger 160 to keep the battery power source 96 in a fully charged condition when conventional AC power is available to the mass storage appliance 60. A source 162 of charging voltage is delivered to the charger 160. The charging voltage source 162 is derived from conventional AC power supplied to the mass storage appliance. The charger 160 converts the power from the source 162 into voltage and current levels which are suitable for charging the battery power source 96.

The integral CPU (not shown) of the bridge and memory controller 80 (FIG. 3) periodically delivers a charger enable signal 164 to the charger 160. The times of application and duration of the charger enable signals 164 are determined in accordance with a charging program which is executed by the integral CPU of the bridge and memory circuit 80. Executing the charging program maintains the best longevity and maximum voltage capacity from the battery power source 96, to sustain data in the DRAM 94 for the maximum amount of time permitted by the battery cells 158.

Although not shown in FIG. 5, the power logic and charger circuit 106 also includes conventional voltage sensors to monitor the voltage across the lithium ion battery cells 158. Signals from these voltage sensors (not shown) are also supplied to the bridge and memory controller 80. By using the voltage cell sensing signals, the bridge and memory controller 80 prevents overcharging and over-discharging the cells 158 to maintain maximum longevity of those cells.

The power logic and charger circuit 106 has been described as monitoring two voltages 98 and 100. Monitoring these two voltages illustrates the capability of monitoring a plurality of internal voltages within a computer system. Under such circumstances the low voltage warning signal could be generated upon any of the internal voltages falling below a predetermined threshold. However auxiliary power would only be connected to power the DRAM upon the voltage which normally powers the DRAM falling below its predetermined threshold.

More details concerning the bus clock generator 76 and its role in detecting the loss of the primary bus clock signal 74

(FIG. 3), are shown in FIGS. 7, 8A, 8B, 8C, 8D, 8E, 8F, 8G, and 8H. The bus clock generator 76 is connected to the bus connector 70 (FIG. 3) and receives the primary bus clock signal 74 from the primary PCI bus 32. As shown in FIG. 7, the bus clock generator circuit 76 comprises a phase locked loop oscillator 170 and a bus clock absence detection circuit 172. The primary bus clock signal 74 is applied to both the phase locked loop oscillator 170 and the bus clock absence detection circuit 172.

The primary function of the phase locked loop oscillator 170 is to replicate the primary bus clock signal 74 with a surrogate bus clock signal 78 that has pulses exhibiting essentially no or zero phase shift or delay compared to the pulses of the primary bus clock signal 74. The output signal 78 supplied by the phase locked loop oscillator 170 is the surrogate for the primary bus clock signal 74. The surrogate bus clock signal 78 is used by the bridge and memory controller 80 (FIG. 3) in exactly the same manner as the primary bus clock signal 74 would normally be used. Because the surrogate bus clock signal 78 is essentially identical in timing to the primary bus clock signal 74, the bridge and memory controller 80 (FIG. 3) functions exactly as it would in response to the primary bus clock signal 74, as long as the primary bus clock signal 74 is present on the primary PCI bus 32. However, should the primary bus clock signal 74 terminate, the bus clock absence detection circuit 172 recognizes the absence of the primary bus clock signal and supplies the bus clock absence signal 112 (FIGS. 3 and 4). Moreover, even though the primary bus clock signal 74 has ceased pulsing or oscillating between opposite digital logic states, the phase locked loop oscillator circuit 170 continues to generate the surrogate bus clock signal 78 for a sufficient time after the termination of the primary bus clock signal 74 to permit the bridge and memory controller 80 to generate the self-refresh enable signal 102 and to apply it to the DRAM 94 (FIGS. 3 and 6), thereby causing the DRAM 94 to commence self-refresh functionality.

The phase locked loop oscillator 170 is a conventional circuit, sometimes also called a zero delay buffer. The circuit 170 includes a conventional oscillator 174 to which the primary bus clock signal 74 is applied. An output signal from the oscillator 174 is applied to a selectable delay circuit 176. The circuit 176 delays the output signal from the oscillator 174 by a predetermined selectable amount of time and applies a delayed signal 178 as feedback to the oscillator 174. The delayed feedback signal 178 adjusts until the output signal from the oscillator 174 is matched or synchronized to the frequency of the primary bus clock signal 74. With the output frequency of the oscillator 174 synchronized to the primary bus clock signal 74, the selectable delay circuit 176 supplies an output signal which is essentially identical in phase to the primary bus clock input signal 74. Thus, the output signal from the selectable delay circuit 176 forms the surrogate bus clock signal 78. The zero delay or zero phase shift between the primary input bus clock signal 74 and the surrogate bus clock signal 78, as created by the phase locked loop oscillator 170, is illustrated in FIGS. 8A and 8B.

The selectable delay circuit 176 of the phase locked loop oscillator 170 includes reactive energy storage elements, such as capacitors, to establish the timing of the delayed feedback signal 178. Moreover, for the oscillator 174 to lock into synchronization with the input signal 74, it is frequently the case that a multiple number of complete cycles of the input signal 74 must occur before the synchronization is established. These conditions will cause the phase locked loop oscillator 170 to continue oscillating for some period of time after the termination of the input primary bus clock signal 74. Consequently, the surrogate bus clock signal 78, which is the output signal from the phase locked loop oscillator 170, will continue to oscillate between opposite digital logic levels or deliver pulses for some amount of time after that time point 180 where the primary bus clock signal 74 ceases pulsing, as shown in FIG. 8A. The continuance of the surrogate bus clock signal 76 beyond the time point 180, as shown in FIG. 8B, is sufficient to generate enough surrogate bus clock cycles to cause the bridge and memory controller 80 to deliver the self-refresh enable signal 102 (FIGS. 3 and 6), all of which is described more completely in the above-referenced invention, Ser. No. 10/219,376.

The bus clock absence detection circuit 172 receives the primary bus clock signal 74 and the surrogate bus clock signal 78 as input signals, and from those signals 74 and 78, recognizes when the primary bus clock signal 74 has terminated. Under those circumstances, the detection circuit 172 delivers the bus clock absence signal 112. To perform these functions, the primary bus clock signal 74 is applied to the clocking input of a D-type flip-flop 182. The not Q output of the flip-flop 182 is connected to the normal input terminal of the flip-flop 182 to cause an output signal at 184 from the Q output terminal of the flip-flop 182 to change states with each applied pulse of the primary bus clock signal 74. In essence, the flip-flop 182 divides the number of pulses of the primary bus clock signal 74 by two as a result of the feedback from its not Q terminal to its input terminal.

The functionality of the flip-flop 182 is illustrated by FIGS. 8A, 8C and 8D. The output signal 184 from the flip-flop 182 at the Q terminal is shown in FIG. 8C, and the inversion of signal 184 from the not Q output terminal is shown in FIG. 8D by signal 186. With each rising edge of the primary bus clock signal 74, the state of the not Q signal 186 at that time becomes the state of the Q signal 184, after the propagation delay of the flip-flop 182. The transition of output states of the flip-flop 182 consume a slight amount of propagation time, so the change in states of the flip-flop 182 as shown by signals 184 and 186 (FIGS. 8C and 8D) is slightly delayed relative to the phase of the primary bus clock signal 74 shown in FIG. 8A.

The Q output signal 184 from the flip-flop 182 is applied to the input terminal of a second D-type flip-flop 188 and to one input terminal of an exclusive OR gate 190. The surrogate bus clock signal 78 is applied to the clock terminal of the flip-flop 188. Because the surrogate bus clock signal 78 has essentially the same timing as the primary bus clock signal 74 (see FIGS. 8A and 8B), an output signal 192 from the flip-flop 188 at its Q terminal changes to the opposite state of the signal 184, while retaining essentially the same frequency as the signal 184. The fact that the flip-flop 188 produces an inverted signal 192 relative to the signal 184 can be understood by observing the relationship between the surrogate bus clock signal 78 shown in FIG. 8B and the state of the signal 184 shown in FIG. 8C, taking into consideration the propagation delay of the flip-flop 188. The propagation delay of the flip-flop 188 is essentially the same as the propagation delay of the flip-flop 182, causing the signal 192 to have essentially the same delay as the signal 182, relative to a leading edge of either of the signals 74 or 78. The inverted relationship of the output signal 192 from the Q terminal of the flip-flop 188 and the output signal 184 from the Q terminal of the flip-flop 182 can be understood by comparing FIGS. 8C and 8E.

The exclusive OR gate 190 delivers a high level output signal 194 whenever the signals 184 and 192 to its input terminals occupy different logical states. When both input signals 184 and 192 occupy the same logical state, either a logical high or logical low level, the output signal 194 from the exclusive OR gate 190 is a logical low level. Because the signals 184 and 192 are relative inversions of each other, they will always occupy mutually opposite logical states so long as the primary bus clock signal 74 is present and causing the flip-flop 182 to function as described. This relationship is illustrated by comparing signals 184 and 192 shown in FIGS. 8C and 8E prior to the time point 180 before the primary bus clock signal 74 ceases. Prior to time point 180, the bus clock signal 74 is present and oscillating between its logical high and low states in the normal fashion. Under these circumstances, the output signal 192 from the exclusive OR gate 190 remains high as a result of the mutual inverted relationship of its two input signals 184 and 192 (FIG. 7).

After time point 180, the absence of the primary bus clock signal 74 causes the flip-flop 182 to maintain the previously existing state of the signal 184, while the continuing surrogate bus clock signal 78 causes the flip-flop 188 to change the level of its output signal 192. The signal 192 changes to the same state as the state of the signal 184. The exclusive OR gate 190 recognizes two input signals of the same logical state, and transitions the output signal 194 from a logical high state to a logical low state shortly after the time point 180. This relationship and functionality are illustrated by the levels of the signals 184, 192 and 194 shown in FIGS. 8C, 8E and 8F, respectively.

The output signal 194 from the exclusive OR gate 190 is applied to the input terminal of a third D-type flip-flop 196. The flip-flop 196 is clocked by the surrogate bus clock signal 78. The logical output level of the signal 194 from the exclusive OR gate 190 is clocked to the output Q terminal of the flip-flop 196 as signal 198 upon the next occurrence of a pulse from the surrogate bus clock signal 78. The Q terminal output signal 198 is essentially latched by the flip-flop 196 by the surrogate bus clock signal 78. The signal 198 is inverted by an inverter 200, and becomes the bus clock absence signal 112. The functionality of the flip-flop 196, as clocked by the surrogate bus clock signal 78, is understood by comparing signals 78, 194 and 198 as shown in FIGS. 8B, 8F and 8G, respectively. The functionality of the inverter 200 is understood by comparing FIGS. 8F and 8G.

In the manner described, the phase locked loop oscillator 170 of the bus clock generator circuit 76 continues to generate pulses of the surrogate bus clock signal 78 after and if the primary bus clock signal 74 ceases at time point 180. The bus clock absence signal 112 is asserted within a few cycles after the absence of the primary bus clock signal 74. The surrogate bus clock signal 78 and the bus clock absence signal 112 are recognized by the bridge and memory controller 80 (FIG. 3), and in response, the self-refresh enable signal 102 is asserted to place the DRAM 94 into the self-refresh state. However, during normal operation when the bus clock signal 74 is present, the surrogate bus clock signal 78 serves as an identical replacement for the primary bus clock signal, and the bus clock absence signal 112 is not asserted.

In response to the self-refresh enable signal 102, the DRAM 94 enters the self-refresh mode of operation. It is desirable for the DRAM 94 to operate in its self-refresh mode under these circumstances because some of the hardware or software errors or malfunctions may result in the loss of the electrical power, although the loss of electrical power may not necessarily be imminent. For example, the software executing on the host CPU 22 may become hung, resulting in the watchdog circuit 110 supplying the bus reset signal 108, but power to the DRAM 94 from the internal supply voltages 98 and 100 may remain unaffected. However, to eliminate the hung condition, it is typical for the user to power off the computer system and then restore power. Under those conditions, the DRAM 94 is already in the self-refresh mode of operation when the power is removed and then restored. In general, if any of the conditions represented by the assertion of the low voltage warning signal 104, the bus reset signal 108 or the bus clock absence signal 112 (FIGS. 3 and 4), it is desirable to place the DRAM 94 in the self-refresh mode of operation as a precaution against a subsequent loss of power.

The DRAM 94 secures high data reliability and high data transfer performance. The relatively low latency of the DRAM 94 permits the read and write transactions to occur rapidly, without inhibiting the overall processing speed of the host CPU 22. Nonvolatility of the low latency DRAM is established by the battery power source 96 and putting the DRAM into its self-refresh mode of operation, and by periodically charging the battery power source 96 when it is not in use powering the DRAM 94. The advantage of using a DRAM for the intermediate memory 94 is its relatively low latency, but to use low latency DRAM for the memory 94 requires the backup power supply from the battery power source 96 in order to assure nonvolatility of the data. Presently-available solid-state memories which have inherent solid-state nonvolatility characteristics are generally not suitable for the use as the intermediate memory 94, because solid-state nonvolatility memory characteristics are achieved with relatively high latency which would diminish the performance of the mass storage appliance 60 in performing mass data transactions.

The bridge and memory controller 80 also coordinates the delivery and receipt of signals to the I/O panel 64, as shown in FIGS. 2 and 3. As shown in FIG. 3, the I/O panel 64 includes a display 210 upon which status information concerning the mass storage appliance 60 is presented. The display 210 may be a relatively small and simple conventional liquid crystal display (LCD) or light emitting diode (LED) display. Control buttons 212 are also included on the I/O panel 64. The control buttons 212 are conventional and simple switches, for example up-down switches, which allow the user to input a relatively small amount of information in response to simple and limited questions or other prompts presented on the display 210.

A microcontroller 214 is also part of the I/O panel 64. The microcontroller 214 controls the operation of the I/O panel 64, by executing functions including presenting signals to the display 210 which cause the display of recognizable information, by receiving signals from the control buttons 212, and by creating and supplying signals to, and receiving signals from, the serial bus 66. A master 20' interface controller (not shown) for the serial bus 66 may be connected to the microcontroller 214, or the microcontroller 214 may additionally execute the functionality of the master interface controller for the serial bus 66. The microcontroller 214 decodes signals supplied by the serial bus 66 to the I/O panel 64 and encodes signals created at the I/O panel 64 by pressing the control buttons 212 in accordance with the communication protocol used by the serial bus 66. A slave interface controller (not shown) at the other end of the serial bus decodes and encodes signals in the same manner as the master interface controller. The slave interface controller may be connected to the integral CPU (not shown) of the bridge and memory controller 80, or the integral CPU of the bridge and memory controller 80 may perform the functions of the slave interface controller.

Preferably, the serial bus 66 is a conventional I²C serial communication bus having the improvements described in the above invention, Ser. No. 10/219,729. A serial bus is satisfactory for communications between the I/O panel 64 and the bridge and memory controller 80 because of the relatively small amount of information which is transferred to the display 210 and from the control switches 212.

The serial bus 66 includes a cable having only a few conductors. As a cable, it is relatively easy to extend from the conversion card 62 to the location of the I/O panel 64. The I/O panel 64 will typically be located on the outside housing or enclosure of the mass storage appliance 60, as is described more completely in the above-referenced invention, Ser. No. 10/219,392. The relatively small size and flexibility of the cable are also a convenience in positioning the I/O panel 64 in a desired location on the exterior of the mass storage application.

The control and status information communicated at the display 210 of the I/O panel 64, or supplied from the control buttons 212 secures the capability to power on and power off the mass storage appliance 60, to display operative and standby status information, and to assert a non-maskable interrupt to force the host CPU 22 (FIG. 2) out of a potentially hung condition, among other things. Although not shown, the I/O panel 64 may include a temperature sensor to sense the ambient temperature of the mass storage appliance 60. Temperature related information will signal the necessity to terminate operation of the mass storage appliance if the ambient temperature becomes too high to adequately cool the mass storage appliance 60.

The I/O panel 64 may be optional. Because of the dedicated functionality of the mass storage appliance 60, it is not necessary to provide the user with ability to receive or communicate even a minimum amount of information.

Figure 9:
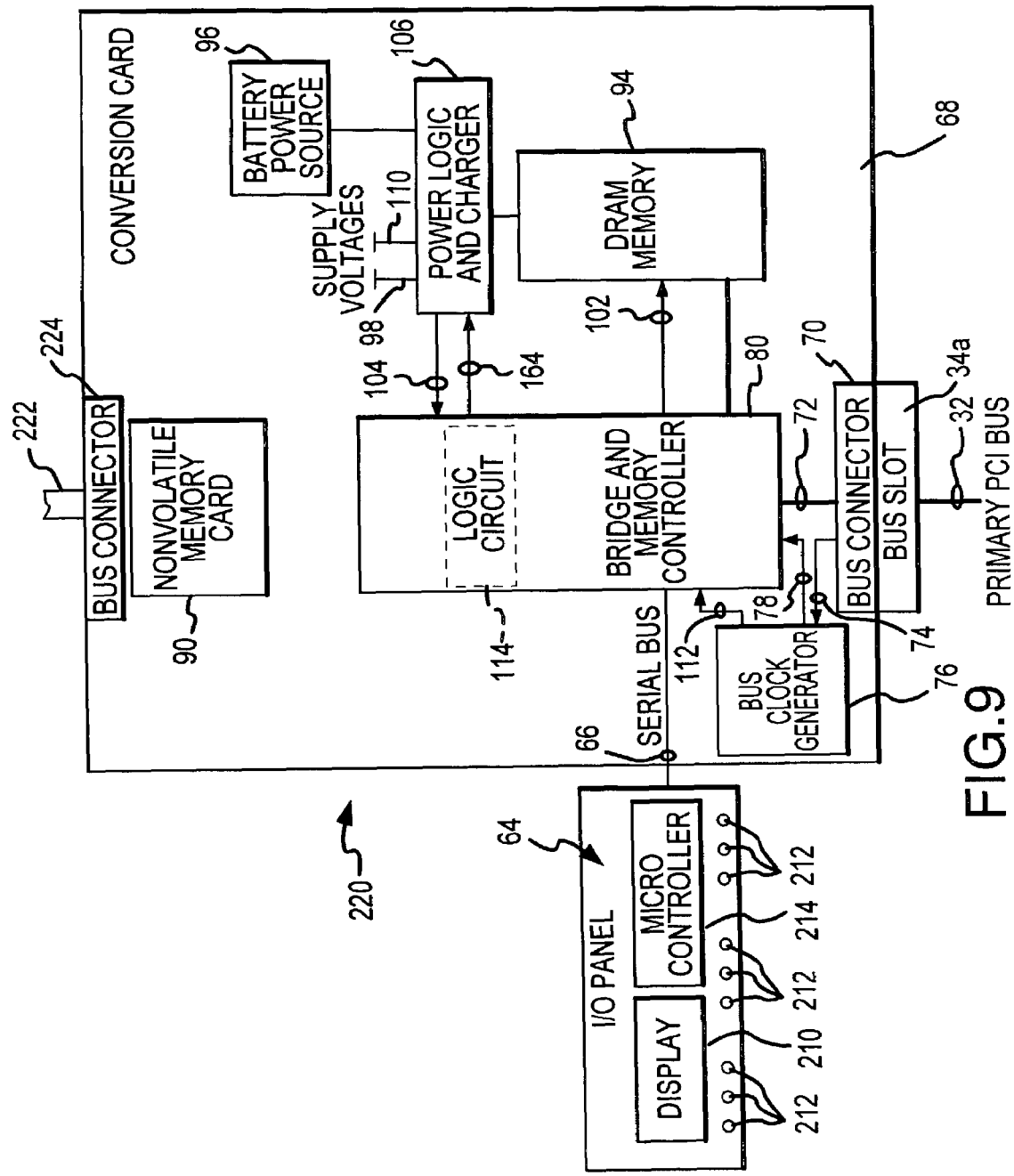
FIG. 9 is a block diagram similar to FIG. 3, illustrating another embodiment of a conversion card in accordance with the present invention.

An alternative form 220 of the conversion card is shown in FIG. 9. In the conversion card 220, the components are the same as those described above in conjunction with the conversion card 62 shown in FIG. 3, except the nonvolatile memory card 90 is connected by a conventional ribbon-like bus conductor 222 to the IDE/ATA bus 28 of the core chipset 24 (FIG. 1). A bus connector 224 is attached to the conversion card 220 for the purpose of connecting bus conductor 222 between the conversion card 220 and the IDE/ATA bus 28 (FIG. 1), as shown in FIG. 10.

Because the memory card 90 has the code which makes it appear as a bootable disk device, the initial boot probe signals from the BIOS of the core chipset 24 on the IDE/ATA bus 28 will cause the memory card 90 to respond by directly transferring and loading the MSOS from the memory card 90 into the main memory 26 over the bus conductor 222. The MSOS will be loaded through the IDE/ATA bus 28, rather than over the PCI bus 32 in the manner previously described in connection with the conversion card 62 (FIGS. 2 and 3).

Figure 10:
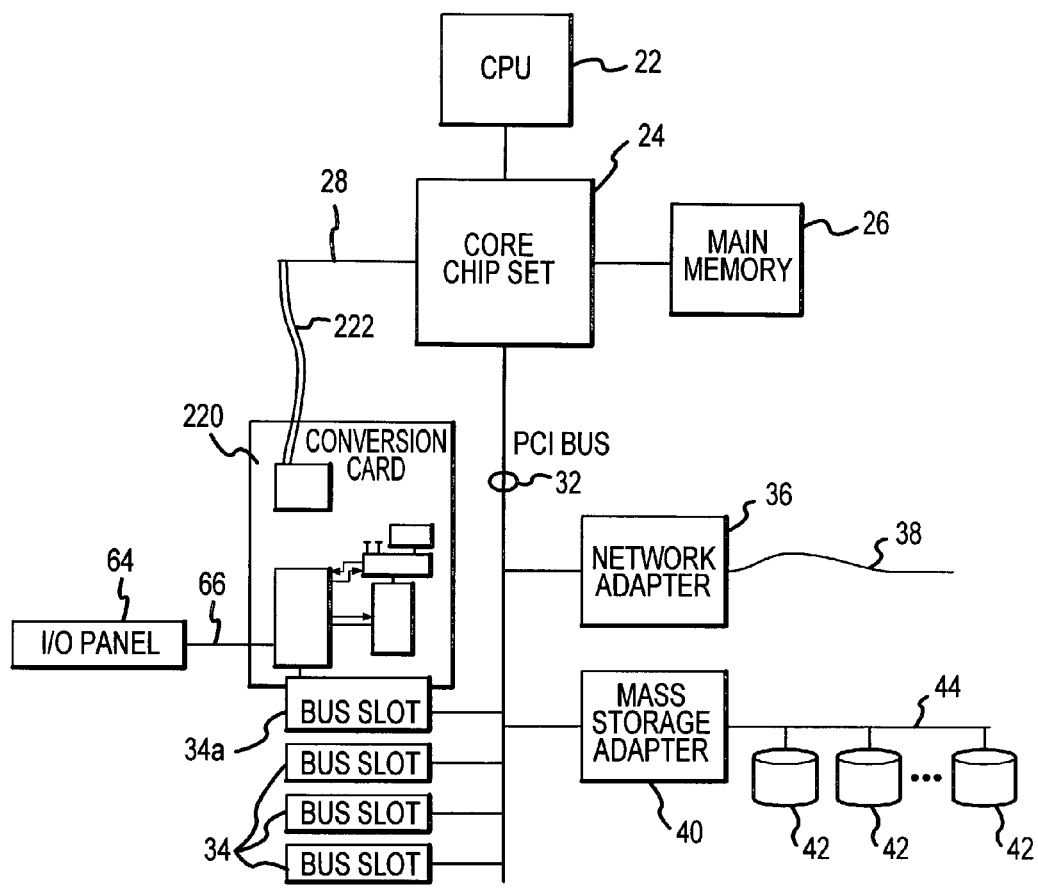
FIG. 10 is an illustration similar to FIG. 2, illustrating the conversion of a general-purpose personal computer into a dedicated, high-performance mass storage appliance by using the conversion card illustrated in FIG. 9.

The conversion card 220 shown in FIGS. 9 and 10 therefore does not require a disk controller 88 (FIG. 3). Furthermore, the bridge and memory controller 80 is not required to respond to boot probe signals from the core chipset 24. However, the conversion card 220 requires additional effort and skill to connect the bus conductor 222 to the IDE/ATA bus 28, which may complicate the installation of the conversion card 220 and the conversion of a general-purpose personal computer server into the mass storage appliance. All other aspects of the conversion card 220 are similar to those of the conversion card 62, described above.

Either of the conversion cards 62 and 220 conveniently and effectively converts a general-purpose personal computer server into a dedicated mass storage appliance 60. The solid-state nonvolatile bootable memory card 90 contains the code of the MSOS, and may be booted directly by the BIOS of the core chipset 24. This direct booting capability from the single reliable code source of the nonvolatile memory card 90 eliminates the need to modify the standard BIOS to accommodate chain booting which would be necessary if the MSOS was distributed over RAID disk drives. As a consequence of using a standard, unmodified version of the BIOS, the personal computer aspects of the mass storage appliance are free to evolve and change without the limitation of chain booting and other modifications to the BIOS. Moreover, the MSOS may be updated conveniently by replacing the memory card 90 with a version that contains an updated operating system, or by downloading new versions from the communication medium 38 (FIGS. 1, 2 and 10). These features assure that the mass storage appliance will continue to offer maximum utilization as a mass storage appliance even as versions of the BIOS and the MSOS evolve and change.

The beneficial aspects of data reliability are preserved by using the low latency, solid-state intermediate DRAM 94, but these features are more conveniently obtained by funneling all of the major error and data-loss risk conditions into a single response which places the DRAM into the data-preserving and battery-backup mode of operation. Low or interrupted power, hardware or software crashes or malfunctions are conditions which are determined by the assertion of a low voltage warning signal, a bus reset signal and a bus clock absence signal, and the signals are funneled into a single response which places the intermediate DRAM into the self-refresh and battery power backup modes of operation on a reliable and effective basis to preserve data within the DRAM. Assuring that sufficient pulses of the surrogate bus clock signal are generated after the absence of the primary bus clock signal assures adequate functionality to place the DRAM into the self-refresh and battery-backup modes of operation, as well as to complete any in-progress data write transactions to the DRAM.

The conversion of the general-purpose personal computer into the dedicated, high-performance mass storage appliance is obtained with relatively simple hardware modifications. Many other advantages and improvements will become apparent after comprehending the full ramifications of the present invention and the invention of the above-referenced, concurrently-filed patent applications.

Preferred embodiments of the present invention and many of its improvements have been described with a degree of particularity. This description of preferred characteristics is not necessarily intended to limit the scope of the invention. The scope of the invention is defined by the following claims.

What is claimed is:

1. A conversion card to convert a conventional general-purpose personal computer into a mass storage appliance dedicated to performing mass data storage functions defined by a mass storage operating system (MSOS), the personal computer having a primary expansion bus by which to connect peripheral devices and over which to communicate signals with the peripheral devices connected to the primary expansion bus, the peripheral devices including at least one disk drive mass storage device with respect to which to read and write data, the personal computer also having a basic input output system (BIOS) which loads programs in response to boot probe signals, the loaded programs operating the personal computer and the devices connected on the primary bus as the mass storage appliance, the conversion card comprising:
- a bus interface on the conversion card to connect the conversion card to the primary bus and through which to communicate signals with the conversion card;
- a secondary bus on the conversion card, the secondary bus extending the functionality of the primary bus onto the conversion card;
- a bridge on the conversion card connected between the interface connector and the secondary bus to exchange signals between the primary bus and the secondary bus;
- a solid-state, memory card on the conversion card and containing nonvolatile code which defines the MSOS and which emulates a disk drive for purposes of booting the MSOS code in response to boot probe signals communicated from the BIOS on the primary bus;
- a disk controller on the conversion card and connected to the bridge and the memory card, the disk controller responding to boot probe signals communicated by the bridge on the secondary bus to identify the memory card as a disk drive and to transfer the MSOS code from the memory card on the secondary bus to the bridge for communication through the bus interface to the primary bus;
- the personal computer responding to the MSOS code to establish mass storage functionality defined by the MSOS code;
- an intermediate memory on the conversion card and connected to the bridge within which to write data supplied from the primary bus and from which to read data for writing to the at least one disk drive device, the intermediate memory having a relatively lesser latency for read and write operations than the latency for read and write operations of each disk drive device;
- the bridge further transferring signals defining data to be written to and read from the intermediate memory between the intermediate memory and the primary bus; and
- a battery power source on the conversion card connected to the intermediate memory to energize the intermediate memory to hold data written therein upon the occurrence of a predetermined error condition.

2. A conversion card as defined in claim 1 wherein: the nonvolatility of the code recorded in the memory card is a result of substantially only solid-state characteristics of the memory card.

3. A conversion card as defined in claim 2 wherein: the memory card has substantially the characteristics of a CompactFlash memory.

4. A conversion card as defined in claim 1 wherein: the memory card has code recorded therein which defines boot loading functionality to assist in loading the MSOS in response to BIOS signals.

5. A conversion card as defined in claim 1 wherein: the peripheral devices connected to the primary bus include a mass storage adapter and a plurality of the disk drives connected to the mass storage adapter in a RAID configuration; and code for a redundant copy of the MSOS is recorded on at least one of the disk drives of the RAID configuration.

6. A conversion card as defined in claim 1 wherein: the peripheral devices connected to the primary bus include a mass storage adapter and a plurality of mass storage disk drives connected to the mass storage adapter in a RAID mass storage configuration; and the BIOS is absent of any code defining a chain booting functionality for loading the MSOS from the disk drives of the RAID mass storage configuration.

7. A conversion card as defined in claim 1 further comprising:
a memory controller on the conversion card and connected to the bridge, the memory controller controlling reading and writing of the data in the intermediate memory.

8. A conversion card as defined in claim 7 wherein: the bridge and memory controller execute data write and data read operations to and from the intermediate memory and transfer signals between the primary bus, the secondary bus and the intermediate memory.

9. A conversion card as defined in claim 1 further comprising:
a first circuit on the conversion card which responds to a signal indicative of a predetermined error condition by connecting the battery power source to the intermediate memory to energize the intermediate memory from the battery power source in response to the signal indicative of the error condition.

10. A conversion card as defined in claim 9 wherein: the intermediate memory comprises a dynamic random access memory (DRAM), the intermediate memory has a self-refresh mode of functionality for the DRAM which is selectable in response to a self-refresh enable signal applied to the intermediate memory; and further comprising:
a second circuit on the conversion card which responds to a signal indicative of a predetermined error condition by applying the self-refresh enable signal to the intermediate memory.

11. A conversion card as defined in claim 10 wherein: the self-refresh enable signal is applied to the intermediate memory before the battery power source is connected to energize the intermediate memory in response to a predetermined error condition.

12. A conversion card as defined in claim 11 wherein: the predetermined error condition includes one of a reduction in power applied to the mass storage appliance, a reset signal on the primary bus, and an absence of a primary bus clock signal on the primary bus.

13. A conversion card as defined in claim 1 wherein: the intermediate memory has a data-sustaining mode of functionality which is selectable in response to an enable signal applied to the intermediate memory, the data-sustaining mode of functionality sustaining data within the intermediate memory; and further comprising:
a logic circuit on the conversion card which responds to a signal indicative of a predetermined error condition by applying the enable signal to the intermediate memory.

14. A conversion card as defined in claim 13 further comprising:
a monitor circuit on the conversion card which controls a connection of the battery power source to the intermediate memory to energize the intermediate memory from the battery power source in response to a predetermined reduction in power to the mass storage appliance.

15. A conversion card as defined in claim 13 wherein: the predetermined error condition determined by the logic circuit includes one of a reduction in power to the mass storage appliance, a reset signal on the primary bus, and an absence of a primary bus clock signal on the primary bus.

16. A conversion card as defined in claim 13 further comprising:
a voltage monitor on the conversion card and receptive of electrical power applied within the mass storage appliance, the voltage monitor determines whether the level of voltage of the power falls below a predetermined threshold and supplies a low voltage warning signal upon the voltage level of the power falling below the predetermined threshold; and
the logic circuit is connected to receive the low voltage warning signal from the voltage monitor, the logic circuit recognizing the low voltage warning signal as the predetermined error condition and supplying the enable signal in response to the low voltage warning signal.

17. A conversion card as defined in claim 16 wherein:
the voltage monitor determines whether the voltage level of power applied to logic circuits within the mass storage appliance falls below a first predetermined threshold and below a second predetermined threshold, the second predetermined threshold being lower than the first predetermined threshold;
the voltage monitor supplying the low voltage warning signal upon the voltage level of the logic power falling below the first threshold;
the voltage monitor supplying a power selection signal upon the voltage level of the logic power falling below the second threshold; and further comprising:
a power control circuit on the conversion card and connected to the battery power source and to the intermediate memory, the power control circuit responding to the power selection signal to connect the battery power source to energize the intermediate memory from the battery power source in response to the power selection signal.

18. A conversion card as defined in claim 17 wherein:
the voltage monitor is further receptive of main power applied principally to circuitry other than the logic circuits within the mass storage appliance, the voltage monitor determines whether the level of voltage of the main power falls below a third predetermined threshold signifying a minimum voltage level for operating the mass storage appliance, the voltage monitor supplying the low voltage warning signal upon one of the voltage level of the logic power falling below the first predetermined threshold or the voltage level of the main power falling below the third predetermined threshold.

19. A conversion card as defined in claim 13 further comprising:
a voltage monitor on the conversion card and receptive of logic power applied to logic circuits within the mass storage appliance and also receptive of main power applied principally to circuitry other than the logic circuits within the mass storage appliance;
the voltage monitor determines whether the voltage level of the main power falls below a predetermined main voltage threshold signifying a minimum voltage level for operation of components other than logic circuits within the mass storage appliance;
the voltage monitor determines whether the voltage level of the logic power falls below a predetermined logic voltage threshold signifying a minimum voltage level for operation of the logic circuits within the mass storage appliance; and the voltage monitor supplying the signal indicative of a predetermined error condition if the voltage level of the main power falls below the main voltage threshold and if the voltage level of the logic power falls below the logic voltage threshold.

20. A conversion card as defined in claim 13 wherein:
the mass storage appliance includes a host CPU connected to the primary bus, the host CPU executing the MSOS functionality, the host CPU supplying a reset signal on the primary bus upon the occurrence of a crash of hardware associated with the host CPU and upon the occurrence of a crash of software executing on the host CPU; and further comprising:
a logic circuit on the conversion card and connected to the bus interface to receive the reset signal, the logic circuit recognizing the reset signal as the predetermined error condition and supplying the enable signal in response to the reset signal.

21. A conversion card as defined in claim 20 wherein:
the host CPU includes a watchdog circuit which monitors the execution of instructions by the host CPU, the watchdog circuit asserting the reset signal on the bus in response to the host CPU ceasing to execute instructions.

22. A conversion card as defined in claim 1 wherein:
the primary bus carries a primary bus clock signal during normal operation of the primary bus; and further comprising:
a bus clock generator on the conversion card, the bus clock generator connected to the bus interface to receive the primary bus clock signal from the primary bus, the bus clock generator responding to the primary bus clock signal to supply a surrogate bus clock signal at the same frequency and having a predetermined timing relationship to the primary bus clock signal, the bus clock generator further including an oscillator which generates the surrogate bus clock signal for a predetermined time after the primary bus clock signal ceases.

23. A conversion card as defined in claim 22 wherein:
the bus clock generator further includes a phase locked loop connected to the oscillator to deliver the surrogate bus clock signal with essentially a zero time delay relative to the primary bus clock signal.

24. A conversion card as defined in claim 22 wherein:
the bus clock generator further includes a bus clock absence detection circuit to detect the cessation of the primary bus clock signal and to deliver a bus clock absence signal in response to the detection of cessation of the primary bus clock signal, the bus clock absence signal indicating the predetermined error condition.

25. A conversion card as defined in claim 24 wherein the bus clock absence detection circuit comprises:
a first circuit element responsive to the primary bus clock signal for supplying a first signal having a first characteristic related to changing states of the primary bus clock signal;
a second circuit element responsive to the surrogate bus clock signal for supplying a second signal having a second characteristic related to changing states of the surrogate bus clock signal; and
a third circuit element responsive to the first and second signals for comparing the changing states of the primary and surrogate bus clock signals and for initiating delivery of the bus clock absence signal upon detecting that the states of the primary bus clock signal are not changing relative to the states of the surrogate bus clock signal.

26. A conversion card as defined in claim 25 wherein:
the third circuit is a signal comparing logic circuit element which compares logical states of the first and second signals.

27. A conversion card as defined in claim 25 wherein:
the first and second circuit elements comprise first and second flip-flops, respectively.

28. A conversion card as defined in claim 25 wherein:
the first circuit element comprises a first flip-flop which includes a clock terminal, an input terminal, an output terminal and an inverted output terminal, the clock terminal of the first flip-flop is connected to receive the primary bus clock signal, the inverted output terminal of the first flip-flop is connected to the input terminal of the first flip-flop, and the output terminal of the first flip-flop supplies the first signal at a frequency which is less than a frequency of the primary bus clock signal;
the second circuit element comprises a second flip-flop which includes a clock terminal, an input terminal, and an output terminal, the clock terminal of the second flip-flop is connected to receive the surrogate bus clock signal, the input terminal of the second flip-flop is connected to the output terminal of the first flip-flop to receive the first signal, and the output terminal of the second flip-flop supplies the second signal which is a delayed version of the first signal and which appears as an inversion of the first signal while the primary bus clock signal occurs normally; and
the third circuit element comprises a logic gate having two input terminals and one output terminal, one input terminal of the logic gate connected to the output terminal of the first flip-flop to receive the first signal and the other input terminal of the logic gate connected to the output terminal of the second flip-flop to receive the second signal, the logic gate supplying a comparison signal at its output terminal which initiates the delivery of the bus clock absence signal upon the first and second signals ceasing to occupy mutually opposite digital logical states.

29. A conversion card as defined in claim 28 further comprising:
a third flip-flop which includes a clock terminal, an input terminal and an output terminal, the clock terminal of the third flip-flop is connected to receive the surrogate bus clock signal, the input terminal of the third flip-flop is connected to the output terminal of the logic gate, and the output terminal of the third flip-flop supplies the bus clock absence signal.

30. A conversion card as defined in claim 28 wherein:
the logic gate comprises an exclusive OR gate.

31. A conversion card as defined in claim 1 further comprising:
a battery charger on the conversion card; and wherein:
the battery power source for the intermediate memory includes a rechargeable battery; and
the battery charger is periodically activated to charge the rechargeable battery.

32. A conversion card as defined in claim 31 wherein:
the rechargeable battery includes at least one lithium ion battery cell.

33. A conversion card as defined in claim 1 wherein:
the battery power source comprises at least two lithium ion battery cells connected in parallel.

34. A conversion card as defined in claim 1 further comprising:
a battery charger on the conversion card and connected to the battery power source, the battery charger operative to periodically charge the battery power source.

35. A conversion card as defined in claim 1 further comprising:
an input output (I/O) panel containing a display and control switches used to display information and supply information, respectively, the I/O panel adapted to be connected to an exterior enclosure of the mass storage appliance; and
a serial bus connecting the I/O panel to the conversion card for communicating signals between the I/O panel and the conversion card.

36. A conversion card as defined in claim 35 further comprising:
a serial bus interface controller on the conversion card; and wherein:
the I/O panel further includes a microcontroller; and
the microcontroller and the interface controller control the communication of signals between one another over the serial bus.

37. A conversion card as defined in claim 1 wherein:
the primary bus is a personal computer interface (PCI) bus;
the PCI bus has a plurality of PCI slots; and
the bus interface includes a bus connector connected to the conversion card and adapted to fit within a PCI slot.

38. A conversion card as defined in claim 1 wherein:
substantially the only application functionality booted to the personal computer is the MSOS; and
the personal computer executes substantially only mass storage functional operations.

39. A conversion card to convert a conventional general-purpose personal computer into a mass storage appliance dedicated to performing mass data storage functions defined by a mass storage operating system (MSOS), the personal computer having a host central processing unit (CPU) to which a local system bus and a primary expansion bus are connected, the primary expansion bus connecting to peripheral devices, the primary bus communicating signals between the host CPU and the peripheral devices connected to the primary bus, the peripheral devices including at least one disk drive mass storage device to which to read and write data, the personal computer also having a basic input output system (BIOS) which loads programs in response to boot probe signals delivered over the local system bus, the loaded programs operating the personal computer and the peripheral devices connected to the primary bus as the mass storage appliance, the conversion card comprising:
a bus interface on the conversion card to connect the conversion card to the primary expansion bus and through which to communicate data with the conversion card;
a solid-state memory card on the conversion card and containing nonvolatile code which defines the MSOS and which emulates a disk drive for purposes of booting the MSOS code in response to boot probe signals;
a connector extending between the memory card and the local system bus to connect the memory card to respond to boot probe signals from the BIOS to identify the memory card as a disk drive and to transfer the MSOS code from the memory card through the connector to the local system bus to be booted and executed by the host CPU to establish mass storage functionality defined by the MSOS code;

an intermediate memory on the conversion card to which to write data supplied by the host CPU and from which to read data to be written to the one mass storage disk drive device, the intermediate memory having a relatively lesser latency for read and write operations than the latency for read and write operations of each mass storage disk drive device;

a bridge on the conversion card and connected between the interface connector and the intermediate memory to exchange signals defining the data between the intermediate memory and the primary bus; and a power source on the conversion card and connected to the intermediate memory to energize the intermediate memory to hold data written therein upon the occurrence of a predetermined error condition.

40. A conversion card as defined in claim 39 further comprising:

a memory controller on the conversion card and incorporated with the bridge, the memory controller controlling writing data to and reading data from the intermediate memory, the memory controller executing data write and data read operations to and from the intermediate memory; and wherein the bridge controls the transfer of signals between the primary bus and the intermediate memory.

41. A method of converting a conventional general-purpose personal computer into a mass storage appliance dedicated to performing mass data storage functions defined by a mass storage operating system (MSOS), the personal computer having a primary expansion bus by which to connect peripheral devices and over which to communicate signals with the peripheral devices connected to the primary bus, the peripheral devices including at least one disk drive mass storage device to which to read and write data, the personal computer also having a basic input output system (BIOS) which loads programs in response to boot probe signals, the loaded programs operating the personal computer and the devices connected on the primary bus as the mass storage appliance, the conversion method comprising:

recording code which defines the MSOS and which emulates a disk drive in a solid-state nonvolatile memory card;

connecting the memory card to respond to boot probe signals from the BIOS to identify the memory card as a disk drive and to transfer the MSOS code from the memory card;

booting the MSOS from the code transferred from the memory card to establish mass storage functionality defined by the MSOS code;

writing data supplied from the primary bus to an intermediate memory;

reading data from the intermediate memory and communicating the data read over the primary bus;

writing the data read from the intermediate memory and communicated over the primary bus to the one mass storage disk drive device;

selecting the intermediate memory to have a relatively lesser latency for read and write operations than the latency for read and write operations of each mass storage disk drive device; and energizing the intermediate memory to hold data written to the intermediate memory upon the incurrence of a predetermined error condition.

42. A method as defined in claim 41 further comprising:
establishing nonvolatility of the code recorded in the memory card by using substantially only solid-state characteristics of the memory card.

43. A method as defined in claim 41 wherein the peripheral devices connected to the primary expansion bus include a mass storage adapter and a plurality of mass storage disk drives connected to the mass storage adapter in a RAID mass storage configuration, the method further comprising:
excluding from the BIOS a requirement for chain booting functionality.

44. A method as defined in claim 41 further comprising:
determining the predetermined error condition from one of a reduction in power to the mass storage appliance, a primary bus reset signal, and an absence of a primary bus clock signal.

45. A general-purpose computer converted into a dedicated mass storage appliance, the general-purpose computer including a host central processing unit (CPU) and core circuitry connected to an expansion bus having at least one expansion slot, the core circuitry containing basic input output system (BIOS) code, the processor, core circuitry, expansion bus and expansion slot all contained within an enclosure of the general purpose computer, the general-purpose computer further comprising:

solid-state, inherently nonvolatile memory card connected to a conversion card which is connected to an expansion slot of the expansion bus, the conversion card located within the enclosure, the memory card containing code which defines a mass storage operating system (MSOS) executable on the host CPU to perform mass data storage functions, the memory card emulating a mass storage disk drive device for booting purposes to permit the MSOS to be booted directly from the memory card in response to boot probe signals communicated from the BIOS over the expansion bus to the memory card, a mass storage adapter connected to the expansion bus, a plurality of mass storage disk drive devices connected to the mass storage adapter, an intermediate memory connected to the conversion card, the intermediate memory having lower latency than the latency of the mass storage disk drive devices, the host CPU writing data to the intermediate memory and reading data from the intermediate memory when executing the mass data storage functions established by the MSOS, the mass storage adapter writing data from the intermediate memory to the mass storage disk drive devices and reading data from the mass storage disk drive devices to the intermediate memory when the host CPU executes the mass data storage functions established by the MSOS, and the intermediate memory connected to a power source separate from a power supply for the general-purpose computer, the separate power source energizing the intermediate memory to hold data written therein upon the occurrence of a predetermined error condition.

46. A general-purpose computer as defined in claim 45 wherein:
the code of the memory card permitting booting of the MSOS without chain booting any component of the MSOS from the mass storage devices.

47. A general-purpose computer as defined in claim 45 wherein:
the intermediate memory is a dynamic random access memory;
the separate power source comprises a battery connected to and retained on the conversion card.

48. A general-purpose computer as defined in claim 45 wherein:

the intermediate memory has a data-sustaining mode of functionality for sustaining data within the intermediate memory which is selectable in response to an enable signal supplied to the intermediate memory; and further comprising:
a logic circuit on the conversion card which supplies the enable signal in response to a predetermined error condition, the predetermined error condition being one of a reduction in power to the mass storage appliance or a reset signal on the primary bus or an absence of a primary bus clock signal on the primary bus.

49. A general-purpose computer as defined in claim 48 further comprising:
a power selection circuit on the conversion card and connected to the separate power source and the intermediate memory to energize the intermediate memory from the separate power source in response to the predetermined error conditions after the logic circuit supplies the enable signal to the intermediate memory.

50. A conversion card as defined in claim 39 wherein:
the nonvolatility of the code recorded in the memory card is a result of substantially only solid-state characteristics of the memory card.

51. A conversion card as defined in claim 39 wherein:
the memory card has code recorded therein which defines boot loading functionality to assist in loading the MSOS in response to BIOS signals.

52. A conversion card as defined in claim 39 wherein:
the peripheral devices connected to the primary bus include a mass storage adapter and a plurality of the disk drives connected to the mass storage adapter in a RAID configuration; and
code for a redundant copy of the MSOS is recorded on at least one of the disk drives of the RAID configuration.

53. A conversion card as defined in claim 39 wherein:
the peripheral devices connected to the primary bus include a mass storage adapter and a plurality of mass storage disk drives connected to the mass storage adapter in a RAID mass storage configuration; and
the BIOS is absent of any code defining a chain booting functionality for loading the MSOS from the disk drives of the RAID mass storage configuration.

54. A conversion card as defined in claim 39 further comprising:
a memory controller on the conversion card and connected to the bridge, the memory controller controlling reading and writing of the data in the intermediate memory.

55. A conversion card as defined in claim 54 wherein:
the bridge and memory controller execute data write and data read operations to and from the intermediate memory and transfer signals between the primary bus, the secondary bus and the intermediate memory.

56. A conversion card as defined in claim 39 further comprising:
a first circuit on the conversion card which responds to a signal indicative of a predetermined error condition by connecting the battery power source to the intermediate memory to energize the intermediate memory from the battery power source in response to the signal indicative of the error condition.

57. A conversion card as defined in claim 56 wherein:
the intermediate memory comprises a dynamic random access memory (DRAM), the intermediate memory has a self-refresh mode of functionality for the DRAM which is selectable in response to a self-refresh enable signal applied to the intermediate memory; and further comprising:
a second circuit on the conversion card which responds to a signal indicative of a predetermined error condition by applying the self-refresh enable signal to the intermediate memory.

58. A conversion card as defined in claim 57 wherein:
the self-refresh enable signal is applied to the intermediate memory before the battery power source is connected to energize the intermediate memory in response to a predetermined error condition.

59. A conversion card as defined in claim 58 wherein:
the predetermined error condition includes one of a reduction in power applied to the mass storage appliance, a reset signal on the primary bus, and an absence of a primary bus clock signal on the primary bus.

60. A conversion card as defined in claim 39 wherein:
the intermediate memory has a data-sustaining mode of functionality which is selectable in response to an enable signal applied to the intermediate memory, the data-sustaining mode of functionality sustaining data within the intermediate memory; and further comprising:
a logic circuit on the conversion card which responds to a signal indicative of a predetermined error condition by applying the enable signal to the intermediate memory.

61. A conversion card as defined in claim 60 wherein:
the predetermined error condition determined by the logic circuit includes one of a reduction in power to the mass storage appliance, a reset signal on the primary bus, and an absence of a primary bus clock signal on the primary bus.

62. A conversion card as defined in claim 60 further comprising:
a voltage monitor on the conversion card and receptive of electrical power applied within the mass storage appliance, the voltage monitor determines whether the level of voltage of the power falls below a predetermined threshold and supplies a low voltage warning signal upon the voltage level of the power falling below the predetermined threshold; and
the logic circuit is connected to receive the low voltage warning signal from the voltage monitor, the logic circuit recognizing the low voltage warning signal as the predetermined error condition and supplying the enable signal in response to the low voltage warning signal.

63. A conversion card as defined in claim 62 wherein:
the voltage monitor determines whether the voltage level of power applied to logic circuits within the mass storage appliance falls below a first predetermined threshold and below a second predetermined threshold, the second predetermined threshold being lower than the first predetermined threshold;
the voltage monitor supplying the low voltage warning signal upon the voltage level of the logic power falling below the first threshold;
the voltage monitor supplying a power selection signal upon the voltage level of the logic power falling below the second threshold; and further comprising:
a power control circuit on the conversion card and connected to the battery power source and to the intermediate memory, the power control circuit responding to the power selection signal to connect the battery power source to energize the intermediate memory from the battery power source in response to the power selection signal.

64. A conversion card as defined in claim 63 wherein:
the voltage monitor is further receptive of main power applied principally to circuitry other than the logic circuits within the mass storage appliance, the voltage monitor determines whether the level of voltage of the main power falls below a third predetermined threshold signifying a minimum voltage level for operating the mass storage appliance, the voltage monitor supplying the low voltage warning signal upon one of the voltage level of the logic power falling below the first predetermined threshold or the voltage level of the main power falling below the third predetermined threshold.

65. A conversion card as defined in claim 60 wherein:
the mass storage appliance includes a host CPU connected to the primary bus, the host CPU executing the MSOS functionality, the host CPU supplying a reset signal on the primary bus upon the occurrence of a crash of hardware associated with the host CPU and upon the occurrence of a crash of software executing on the host CPU; and further comprising:
a logic circuit on the conversion card and connected to the bus interface to receive the reset signal, the logic circuit recognizing the reset signal as the predetermined error condition and supplying the enable signal in response to the reset signal.

66. A conversion card as defined in claim 65 wherein:
the host CPU includes a watchdog circuit which monitors the execution of instructions by the host CPU, the watchdog circuit asserting the reset signal on the bus in response to the host CPU ceasing to execute instructions.

67. A conversion card as defined in claim 39 wherein:
the primary bus carries a primary bus clock signal during normal operation of the primary bus; and further comprising:
a bus clock generator on the conversion card, the bus clock generator connected to the bus interface to receive the primary bus clock signal from the primary bus, the bus clock generator responding to the primary bus clock signal to supply a surrogate bus clock signal at the same frequency and having a predetermined timing relationship to the primary bus clock signal, the bus clock generator further including an oscillator which generates the surrogate bus clock signal for a predetermined time after the primary bus clock signal ceases.

68. A conversion card as defined in claim 67 wherein:
the bus clock generator further includes a bus clock absence detection circuit to detect the cessation of the primary bus clock signal and to deliver a bus clock absence signal in response to the detection of cessation of the primary bus clock signal, the bus clock absence signal indicating the predetermined error condition.

69. A conversion card as defined in claim 68 wherein the bus clock absence detection circuit comprises:
a first circuit element responsive to the primary bus clock signal for supplying a first signal having a first characteristic related to changing states of the primary bus clock signal;
a second circuit element responsive to the surrogate bus clock signal for supplying a second signal having a second characteristic related to changing states of the surrogate bus clock signal; and
a third circuit element responsive to the first and second signals for comparing the changing states of the primary and surrogate bus clock signals and for initiating delivery of the bus clock absence signal upon detecting that the states of the primary bus clock signal are not changing relative to the states of the surrogate bus clock signal.

70. A conversion card as defined in claim 39 further comprising:
a battery charger on the conversion card; and wherein:
the battery power source for the intermediate memory includes a rechargeable battery; and
the battery charger is periodically activated to charge the rechargeable battery.

71. A conversion card as defined in claim 70 wherein:
the rechargeable battery includes at least one lithium ion battery cell.

72. A conversion card as defined in claim 39 wherein:
the battery power source comprises at least two lithium ion battery cells connected in parallel.

73. A conversion card as defined in claim 39 further comprising:
an input output (I/O) panel containing a display and control switches used to display information and supply information, respectively, the I/O panel adapted to be connected to an exterior enclosure of the mass storage appliance; and
a serial bus connecting the I/O panel to the conversion card for communicating signals between the I/O panel and the conversion card.

74. A conversion card as defined in claim 73 further comprising:
a serial bus interface controller on the conversion card; and wherein:
the I/O panel further includes a microcontroller; and
the microcontroller and the interface controller control the communication of signals between one another over the serial bus.

75. A conversion card as defined in claim 39 wherein:
the primary bus is a personal computer interface (PCI) bus;
the PCI bus has a plurality of PCI slots; and
the bus interface includes a bus connector connected to the conversion card and adapted to fit within a PCI slot.

76. A conversion card as defined in claim 39 wherein:
substantially the only application functionality booted to the personal computer is the MSOS; and
the personal computer executes substantially only mass storage functional operations.

* * * * *